United States Patent [19]
Yamada et al.

[11] Patent Number: 5,708,531
[45] Date of Patent: Jan. 13, 1998

[54] OBJECTIVE LENS SYSTEM

[75] Inventors: Hiroshi Yamada, Hiratsuka; Yutaka Suenaga, Yokohama; Itoe Ito, Kawasaki, all of Japan

[73] Assignee: Nikon Corporation, Japan

[21] Appl. No.: 712,985

[22] Filed: Sep. 10, 1996

Related U.S. Application Data

[62] Division of Ser. No. 527,143, Sep. 12, 1995.

[30] Foreign Application Priority Data

Sep. 13, 1994 [JP] Japan ................... 6-244610
Sep. 13, 1994 [JP] Japan ................... 6-244611
Sep. 13, 1994 [JP] Japan ................... 6-244612

[51] Int. Cl.$^6$ ................ G02B 21/02; G02B 9/14
[52] U.S. Cl. ................ 359/658; 359/660; 359/661; 359/787
[58] Field of Search ................ 359/661, 660, 359/658, 787

[56] References Cited

U.S. PATENT DOCUMENTS

| | | | |
|---|---|---|---|
| 3,623,792 | 11/1971 | Uetake | 359/661 |
| 3,883,231 | 5/1975 | Koizumi | 359/660 |
| 4,403,835 | 9/1983 | Ushida | 359/661 |
| 4,953,962 | 9/1990 | Esswein et al. | 359/660 |
| 5,305,147 | 4/1994 | Hasegawa et al. | 359/787 |
| 5,469,299 | 11/1995 | Nagano | 359/661 |
| 5,502,596 | 3/1996 | Suzuki | 359/658 |
| 5,530,590 | 6/1996 | Saito | 359/658 |

FOREIGN PATENT DOCUMENTS 0005996  3/1969  Japan ................... 359/661

*Primary Examiner*—Georgia Y. Epps
*Assistant Examiner*—Evelyn A. Lester
*Attorney, Agent, or Firm*—Pennie & Edmonds LLP

[57] ABSTRACT

This invention relates to a microscope objective lens system a part of which is immersed in a liquid to observe a sample present in the liquid. Particularly, this invention provides an apochromat-grade microscope objective lens system which can be machined cheaply and easily by the conventional technology, which is well corrected for chromatic aberration, and which is excellent in flatness of the image plane. This objective lens system has a plane-parallel plate on the most sample side, is constructed without using an embedded lens as used in the conventional objectives, and can take a variety of lens layouts.

11 Claims, 20 Drawing Sheets

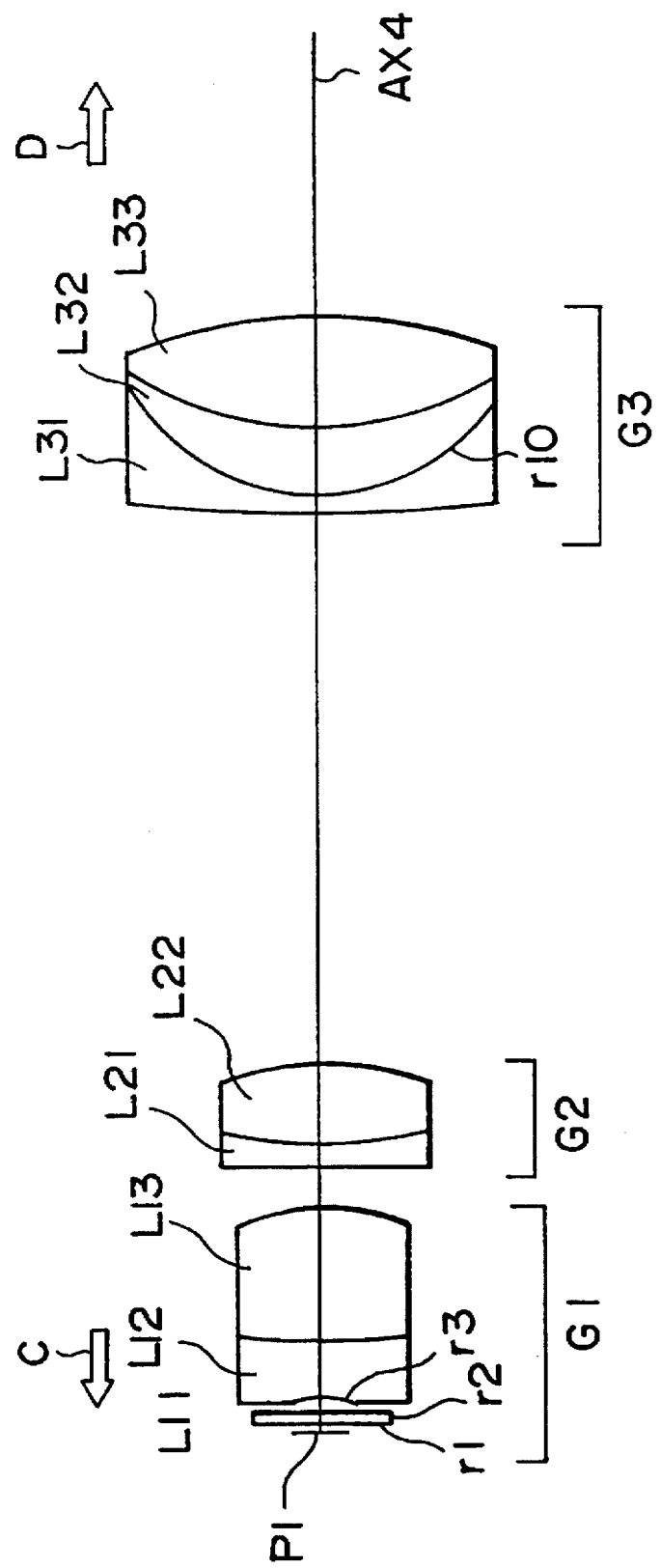

SPHERICAL ABERRATION

ASTIGMATISM

SPHERICAL ABERRATION

ASTIGMATISM

SPHERICAL ABERRATION

ASTIGMATISM

SPHERICAL ABERRATION

ASTIGMATISM

SPHERICAL ABERRATION

ASTIGMATISM

CHROMATIC ABERRATION OF MAGNIFICATION

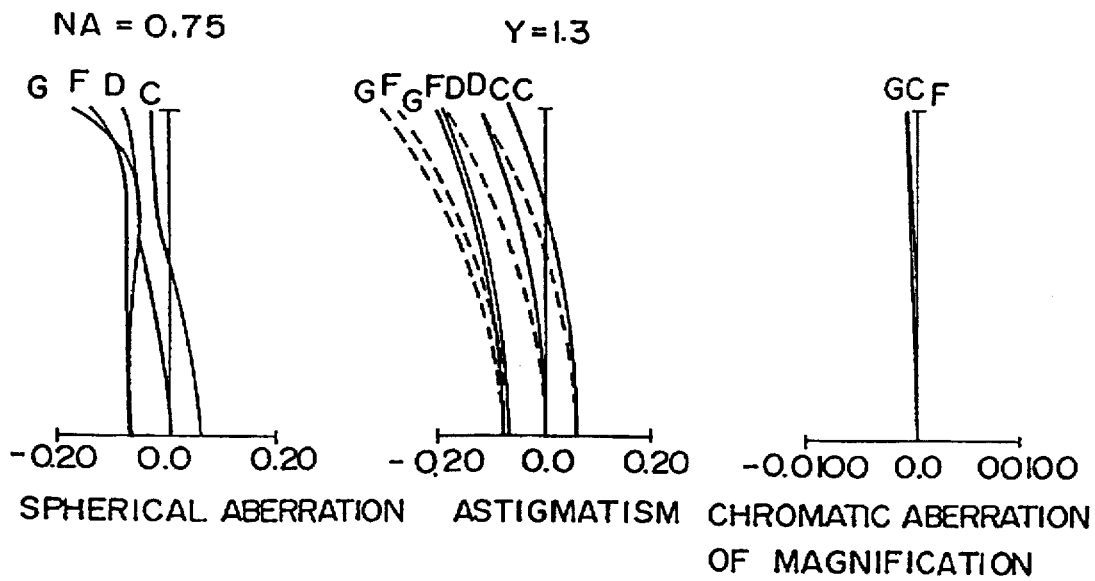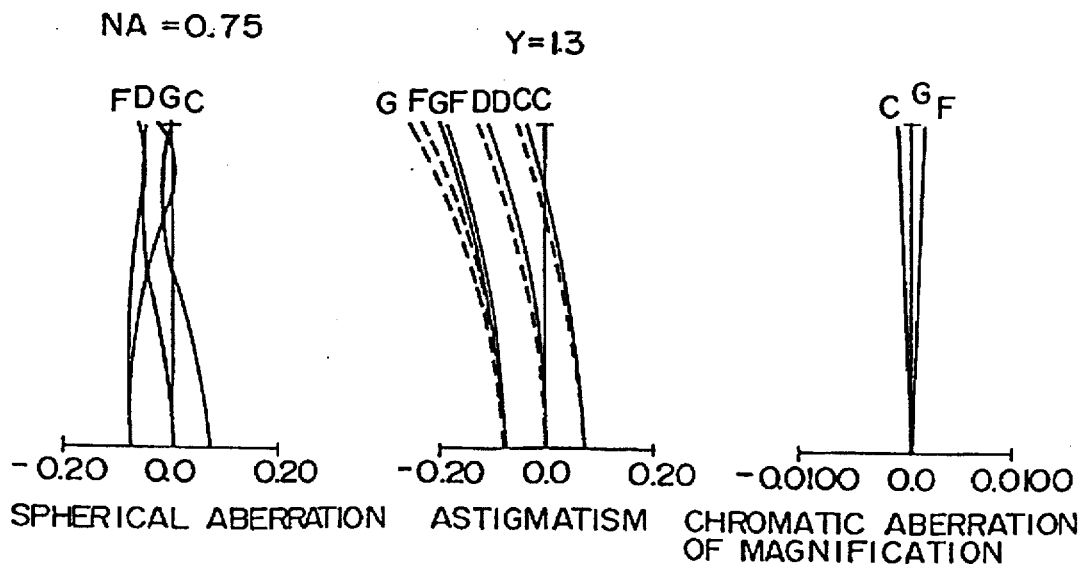

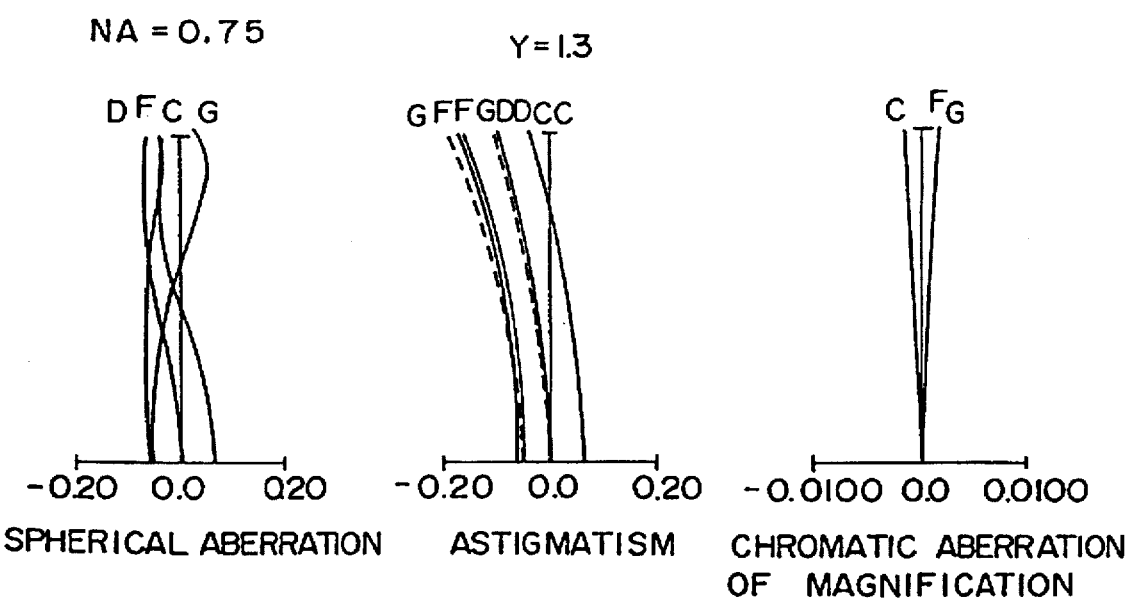

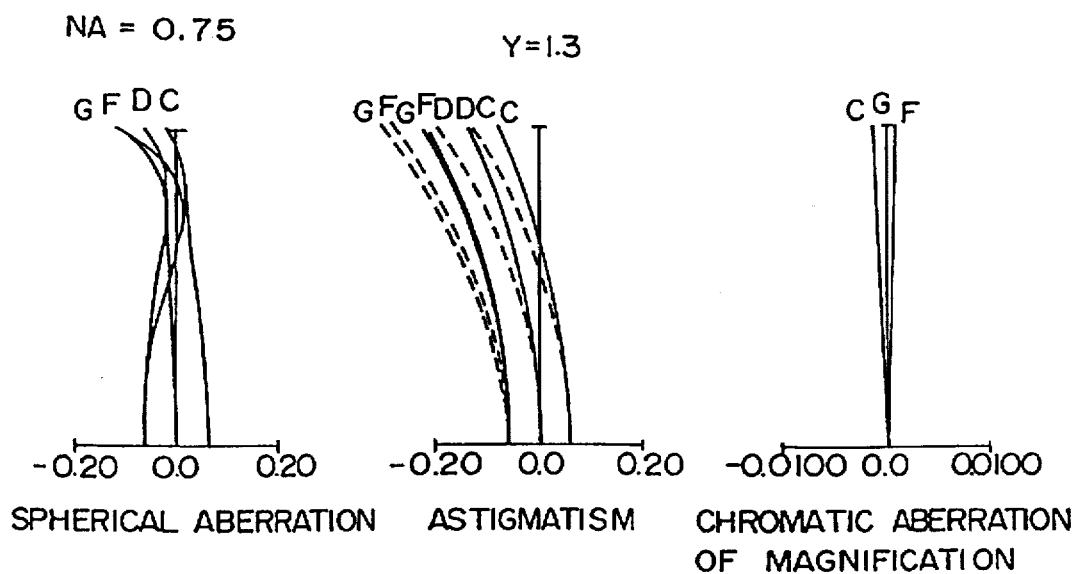
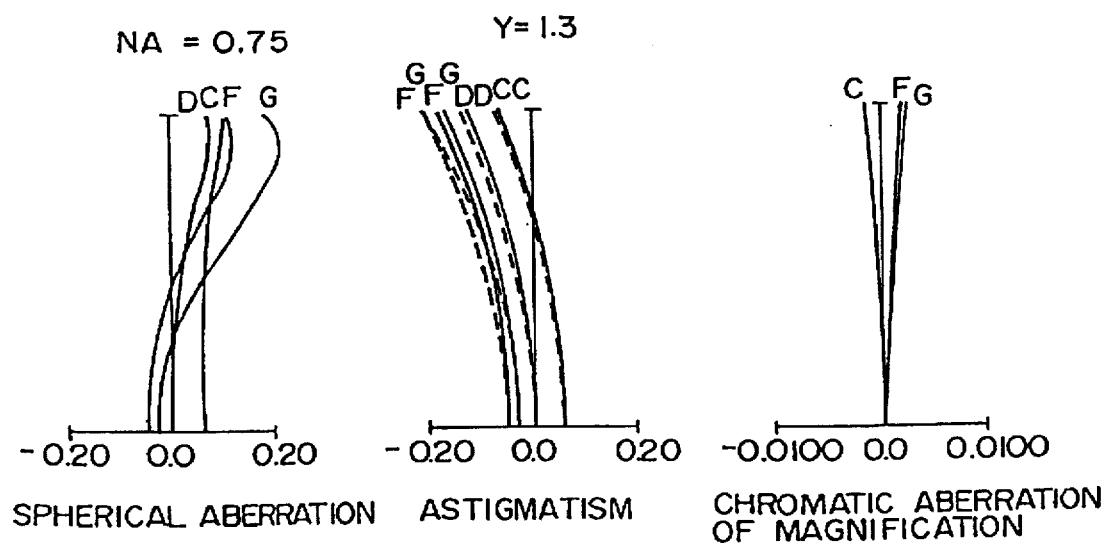

FIG.26A
FIG.26B
FIG.26C
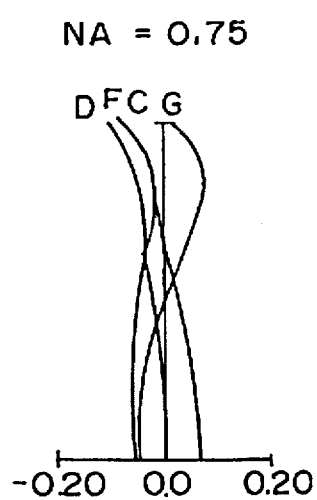
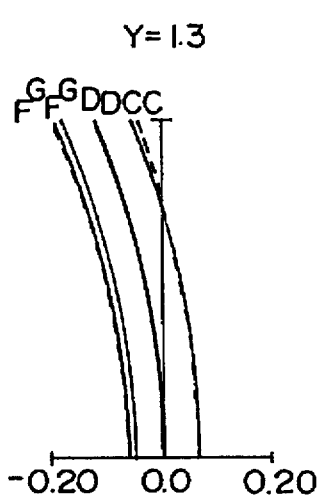
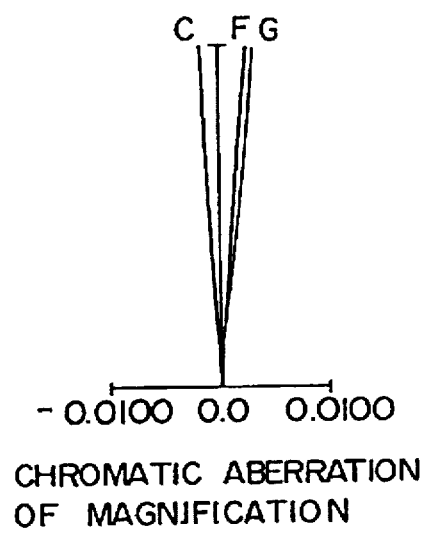
SPHERICAL ABERRATION
ASTIGMATISM
CHROMATIC ABERRATION OF MAGNIFICATION

1

OBJECTIVE LENS SYSTEM

This is a division of application Ser. No. 08/527,143, filed Sep. 12, 1995, which is still pending.

BACKGROUND OF THE INVENTION

1. Field of the Invention

The present invention relates to an objective lens system, and more particularly to an immersion planapochromat-grade medium-power microscope objective.

2. Related Background Art

Conventional immersion microscope objectives are capable of being used for only a type of liquid. Consequently, if observing objects each are adaptive to different liquids, for example one to water and another to oil, the objective must be changed one from another so as to match each of the observing objects.

Thus, there are demands for an immersion microscope objective that can be used for some types of liquids having different refractive indices, for example water, oil, and glycerin. However, because water, oil, and glycerin have respective indices ranging from about 1.3 to about 1.6, aberrations remain as not being corrected well.

An example of such conventional immersion apochromat-grade objectives is the objective as disclosed in the bulletin of Japanese Laid-open Patent Application No. 59-155822. The objective disclosed in this bulletin uses a cemented lens including an embedded lens as a front lens (a lens closest to the object). By properly setting a radius of curvature of an interface (cemented surfaces) of the cemented lens and an index difference between two component lenses in the cemented lens, the Petzval sum is decreased to correct the curvature of field.

SUMMARY OF THE INVENTION

The conventional method using the cemented lens including the embedded lens as a front lens is useful in terms of designing and is frequently used these days. It has, however, difficulties in machining of lens in fact.

First, a concave surface in which another lens is embedded is a curved surface with a considerably strong curvature, and a glass with a refractive index of about 1.8 is selected for the lens in which the other lens is embedded. However, many glass species with refractive indices of about 1.8 are hard. Consequently, machining of the concave surface is very difficult and takes a considerable time, thus being likely to increase the cost. On the other hand, an image-side convex surface of the embedded lens also has a strong curvature, frequently up to nearly a semisphere. This requires precise polishing to an effective region.

An object of the present invention is to provide an immersion apochromat-grade microscope objective lens system which can be machined well at low cost by the conventional machining techniques without using an embedded lens, which is well corrected for chromatic aberration, and which is good in flatness of the image plane.

Further, because the conventional immersion microscope objectives each can be used for only a type of liquid, in case of appropriate liquids being applied to respective observing objects, optimal objectives must be used as switching one from another in order to observe them under good imaging performance. For example, in case of the above liquids being water, oil, and glycerin, which have respective indices ranging from 1.3 to 1.6, sufficient correction would not be assured for aberrations. Another object of the present invention is to provide an immersion apochromat-grade microscope objective lens system that can be used for a variety of liquids having different refractive indices, such as water, oil, and glycerin.

The objective lens system according to the present invention can be applied to various microscopes. A microscope to which the objective lens system of the present invention can be applied is arranged as shown in FIG. 1, in which at least the objective lens system 105 of the invention is mounted on a revolver 106 and which has a lens barrel 107 for holding an optical system including the objective lens system 105, a stage 100 having a main surface on which a sample, being an observed object, can be placed, a stand 103 for supporting the lens barrel 107 and stage 100, and an optical adjusting mechanism for adjusting relative positions of the objective lens system 105 and the stage 100. When an observer rotates handles 102a, 102b provided left and right of the stand 103, the optical adjusting mechanism moves the stage 100 perpendicularly to the optical axis AX. A handle 101 provided on the back face of the stage 100 is for moving the sample placed on the stage 100.

A first embodiment of the objective lens system according to the present invention comprises, for example as shown in FIG. 4, a first lens group G1 having a plane-parallel plate L11 consisting of two surfaces substantially parallel to each other and a cemented lens arranged with a concave surface opposed to the object side and composed of a lens L12 and a lens L13, the first lens group G1 having a negative refractive power as a whole, a second lens group G2 having a positive refractive power, and a third lens group G3 having a positive refractive power, in order from the object side. In the drawing, AX4 represents the optical axis in the first embodiment.

In the immersion microscope objectives, the lens surface closest to the object (most-object-side lens surface) must be flat or slightly convex to the object in order to keep bubbles from intruding between the lens surface and the liquid. Thus, the objective lens system of the present invention is arranged to have the plane-parallel plate consisting of the two surfaces nearly parallel to each other, on the most object side, as described above. In the present specification, the "plane-parallel plate" is a concept including lenses having very gentle curvatures.

In the objective lens system of the present invention, the first lens group G1 decreases the Petzval sum, the second lens group G2 corrects chromatic aberration and slightly overcorrects spherical aberration, and the third lens group G3 corrects spherical aberration and curvature of field.

The objective lens system of the first embodiment of this invention satisfies the following conditions of formula (1) to formula (4).

$$|(N1a \cdot F)/r1| \leq 0.13 \qquad (1)$$

$$|(N1a \cdot F)/r2| \leq 0.13 \qquad (2)$$

$$0.16 < |r3/(N1b \cdot F)| < 0.2 \qquad (3)$$

$$2 < f3/F < 3.5 \qquad (4)$$

In the above formulas,

F: a composite focal length of the overall lens system, r1: a radius of curvature of the object-side surface of the plane-parallel plate L11, r2: a radius of curvature of the image-side surface of the plane-parallel plate L11, r3: a radius of curvature of an object-side concave surface of the object-side lens L12 in the cemented lens, N1a: an index of refraction of the plane-parallel plate L11 for the d-line ($\lambda=587.6$ nm), N1b: an index of refraction of the lens L12 for the d-line ($\lambda=587.6$ nm), f3: a focal length of the third lens group G3.

The conditions of formula (1) and formula (2) define appropriate ranges for the lens shape, assuming that the plane-parallel plate L11 in the first lens group G1 is a lens having very gentle curvatures.

Above the upper limits in the conditions of formula (1) and formula (2), the Petzval sum increases to degrade flatness of the image plane, thus being inconvenient.

The condition of formula (3) defines an appropriate range for the shape of the object-side concave surface of the cemented lens in the first lens group G1.

Above the upper limit of the condition of formula (3), the Petzval sum becomes too great so as to degrade the curvature of field. Also, the total lens length (a distance along the optical axis from the most-object-side surface to the image plane) becomes long.

Inversely, below the lower limit of the condition of formula (3), light beams diverge too wide so as to degrade spherical aberration and to overcorrect axial chromatic aberration.

The condition of formula (4) defines an appropriate range for the focal length f3 of the third lens group G3.

Above the upper limit of the condition of formula (4), the total lens length becomes long, and axial chromatic aberration and spherical aberration become worse.

Inversely, below the lower limit of the condition of formula (4), light beams from the second lens group are bent too much, which gives rise to spherical aberration too great for the third lens group G3 to correct, thus being not preferred.

In order to achieve further better imaging performance, the objective lens system of the first embodiment is preferably so arranged that the third lens group G3 comprises a cemented lens having an interface between a lens L31 and a lens L32 in order from the object side and that the objective lens system further satisfies the following conditions of formula (5) and (6) in addition to the above-discussed conditions.

$$0.01 < |(N3b-N3a) \cdot F/r10| \quad (5)$$

$$|N3a-N3b| < 0.3 \quad (6)$$

In the above formulas, r10: a radius of curvature of the interface between the lens L31 and lens L32, N3a: an index of refraction of the lens L31 for the d-line ($\lambda=587.6$ nm), N3b: an index of refraction of the lens L32 for the d-line ($\lambda=587.6$ nm).

In the objective lens system of the first embodiment satisfying the above-discussed conditions, the third lens group G3 preferably includes the above interface shaped with a convex surface opposed to the object side in order to correct shifts of coma due to colors, likely to be caused by the first and second lens groups G1, G2, thereby achieving further better imaging performance. Further, in order to correct curve of coma in shorter wavelengths than the reference wavelength, the cemented lens including the lenses (L31, L32) forming the above cemented surfaces is preferably shaped in a meniscus shape with a convex surface opposed to the object side. In order to correct distortion of coma in the longer wavelengths than the reference wavelength, a positive lens L33 is preferably provided on the image side of the lenses (L31, L32) forming the interface. In this arrangement, the cemented lens of the third lens group G3 has the first interface formed by the lens L31 and the lens L32 and the second interface formed by the lens L32 and the lens L33.

The condition of formula (5) defines an appropriate range as to the magnitude of a difference between the refractive index of the lens L31 and the refractive index of the lens L32 in the third lens group G3 and the radius of curvature of the interface between them.

Below the lower limit of the condition of formula (5), spherical aberrations of higher orders by colors are not corrected at all and the image plane is also degraded, thus being inconvenient.

The condition of formula (6) defines an appropriate range for the magnitude of the difference between the refractive index of the lens L31 and the refractive index of the lens L32 in the third lens group G3.

Above the upper limit of the condition of formula (6), the spherical chromatic aberrations of higher orders are not corrected at all and the image plane is also degraded.

Since the third lens group G3 comprises the cemented lens having the interface between the lens L31 and lens L32 arranged in order from the object side, the objective system can be used under good imaging performance for three types of liquids, water, oil, and glycerin, as shown in the embodiments described later. Further, the third lens group G3 is preferably so arranged that another lens L33 is disposed on the image side of the lens L32 so as to have two interfaces in total. This is for correcting distortion of coma in the longer wavelengths than the reference wavelength.

A second embodiment of the objective lens system according to the present invention comprises, for example as shown in FIG. 12, a first lens group G1 having a plane-parallel plate L11 consisting of two surfaces substantially parallel to each other, a lens L12 with a concave surface opposed to the object side, and a positive meniscus lens L13, a second lens group G2 having two cemented lenses and having a positive refractive power as a whole, a third lens group G3 having a cemented lens of a negative lens L31 and a positive lens L32 and having a negative refractive power as a whole, and a fourth lens group G4 having a cemented lens of a positive lens L41 and a negative lens L42 and having a negative refractive power as a whole, in order from the object side. In the drawing, AX6 represents the optical axis of the second embodiment.

The "plane-parallel plate" in the second embodiment is also the concept including lenses having very gentle curvatures, similarly as in the first embodiment as discussed above.

The objective lens system of the second embodiment satisfies the following conditions of formula (7) to formula (11).

$$|(N1a \cdot F)/r1| \leq 0.06 \quad (7)$$

$$|(N1a \cdot F)/r2| \leq 0.06 \quad (8)$$

$$0.3 < r3/(N1b \cdot F) < 0.4 \quad (9)$$

$$6 < |f12/F| + |f42/F| < 9 \quad (10)$$

$$3 < f2/F < 4 \quad (11)$$

In the above formulas,

F: a composite focal length of the overall lens system, r1: a radius of curvature of the object-side surface of the plane-parallel plate L11, r2: a radius of curvature of the image-side surface of the plane-parallel plate L11, r3: a radius of curvature of an object-side concave surface of the lens L12, N1a: an index of refraction of the plane-parallel plate L11 for the d-line ($\lambda=587.6$ nm), N1b: an index of refraction of the lens L12 for the d-line ($\lambda=587.6$ nm), f12: a focal length of the lens L12, f42: a focal length of the negative lens L42, f2: a focal length of the second lens group G2.

The conditions of formula (7) and formula (8) define appropriate ranges for the lens shape, assuming, similarly as in the first embodiment, that the plane-parallel plate L11 in the first lens group G1 is a lens having very gentle curvatures.

Above the upper limits of the conditions of formula (7) and formula (8), the Petzval sum becomes great and flatness of the image plane becomes worse, thus being inconvenient.

The condition of formula (9) defines an appropriate range for the shape of the concave surface of the lens L12 with the concave surface opposed to the object side in the first lens group G1.

Above the upper limit of the condition of formula (9), the Petzval sum becomes too great and the curvature of field becomes degraded. Also, the total lens length (a distance along the optical axis from the most-object-side surface to the image plane) becomes long.

Inversely, below the lower limit of the condition of formula (9), light beams diverge too wide, spherical aberration becomes worse, and axial chromatic aberration becomes overcorrected.

The condition of formula (10) defines an appropriate range for the refractive power of the lens L12 with the concave surface opposed to the object side in the first lens group G1 and the refractive power of the negative lens L42 in the fourth lens group G4, thus determining the condition as to the flatness of the image plane.

Above the upper limit of the condition of formula (10), the curvature of field becomes overcorrected, thus being not preferred.

Inversely, below the lower limit of the condition of formula (10), the magnification becomes large, which will result in increasing the total lens length, thus being inconvenient.

In the second embodiment, the second lens group G2 has a great effect on achromatization, and the second lens group G2 is arranged to generate a little negative chromatic aberration. Here, above the upper limit of the above condition of formula (11), the refractive power of the second lens group G2 becomes too weak so as to give rise to great negative spherical aberration, and light beams become incident into the third lens group G3 as leaving upper coma not fully corrected, so as to make coma over, thus being unpreferable. Below the lower limit of the above condition of formula (11), the refractive power of the second lens group G2 becomes too strong, so as to give rise to great positive spherical aberration and to make coma under, thus being not preferred.

A third embodiment of the objective lens system according to the present invention comprises, for example as shown in FIG. 16, a first lens group G1 having a plane-parallel plate L11 consisting of two surfaces substantially parallel to each other, a lens L12 with a concave surface opposed to the object side, and a positive meniscus lens L13, a second lens group G2 having two cemented lenses and having a positive refractive power as a whole, a third lens group G3 having a cemented lens composed of a negative lens L31 and a positive lens L32 in order from the object side and shaped with a concave surface opposed to the object side as a whole, the third lens group G3 having a negative refractive power, a fourth lens group G4 having a cemented lens of a positive lens L41 and a negative lens L42 and having a negative refractive power as a whole, in order from the object side, and a moving mechanism for moving the third lens group G3 along the optical axis. In the drawing, AX8 is the optical axis of the third embodiment.

The "plane-parallel plate" in the third embodiment is also the concept including lenses having very gentle curvatures, similarly as in the first embodiment.

The third lens group G3 is constructed as a correcting lens group, which is properly moved along the optical axis to achieve good imaging performance for liquids with different refractive indices. Namely, the third embodiment is so arranged that the third lens group G3 has the cemented lens composed of the negative lens L31 and the positive lens L32 in order from the object side and that the most-object-side lens surface of the third lens group G3 is concave. In this embodiment aberrations occurring upon change of liquid are corrected by moving the third lens group G3. On this occasion, the third embodiment changes corrected states of aberrations mainly by movement of the interface in the cemented lens. Here, the most-object-side lens surface of the third lens group G3 refracts rays from the second lens group G2 in diverging directions, and thus, this arrangement can increase heights of incidence of rays reaching the interface. Therefore, the movement of the interface can expand the range of changes of the corrected states of aberrations.

The objective lens system of the third embodiment satisfies the following conditions of formula (12) to formula (17).

$$|(N1a-F)/r1| \leq 0.06 \tag{12}$$

$$|(N1a-F)/r2| \leq 0.06 \tag{13}$$

$$2 < |(N1b-F)/r3| < 4 \tag{14}$$

$$0.05 < d13/F < 0.85 \tag{15}$$

$$0.01 < |F/f3| < 0.025 \tag{16}$$

$$0.9 < (d13+d16)/F < 1.2 \tag{17}$$

In the above formulas,

F: a composite focal length of the overall lens system, r1: a radius of curvature of the object-side surface of the plane-parallel plate L11, r2: a radius of curvature of the image-side surface of the plane-parallel plate L11, r3: a radius of curvature of the object-side concave surface of the lens L12, N1a: an index of refraction of the plane-parallel plate L11 for the d-line ($\lambda=587.6$ nm), N1b: an index of refraction of the lens L12 for the d-line ($\lambda=587.6$ nm), f3: a focal length of the third lens group G3, d13: an axial air space between the second lens group G2 and the third lens group G3, d16: an axial air space between the third lens group G3 and the fourth lens group G4.

The conditions of formula (12) and formula (13) define appropriate ranges for the lens shape, assuming, similarly as in the first embodiment, that the plane-parallel plate L11 of the first lens group G1 is a lens having very gentle curvatures.

Above the upper limits of the conditions of formula (12) and formula (13), the Petzval sum becomes great and the flatness of the image plane becomes worse, thus being inconvenient.

The condition of formula (14) defines an appropriate range for the concave surface shape of the lens L12 with the concave surface opposed to the object side in the first lens group G1.

Above the upper limit of the condition of formula (14), the Petzval sum becomes too large and the curvature of field becomes worse. Also, the total lens length (a distance along the optical axis from the most-object-side surface to the image plane) becomes long.

Inversely, below the lower limit of the condition of formula (14), light beams diverge too wide, spherical aberration becomes worse, and axial chromatic aberration becomes overcorrected.

The condition of formula (15) defines an appropriate range for the axial air space d13 between the second lens group G2 and the third lens group G3 being the correcting lens group.

If a liquid has a large index of refraction, for example like oil, correction of spherical aberration becomes insufficient. Thus, the third lens group G3 is moved toward the image (toward the fourth lens group G4). Namely, the axial air space d13 is expanded between the second lens group G2 and the third lens group G3, and rays are let to enter the third lens group G3 and fourth lens group G4 before the heights of incidence of rays into the third lens group G3 become lowered. This causes positive spherical aberration by the third lens group G3 and fourth lens group G4, thereby canceling variations of spherical aberration as the overall lens system.

Above the upper limit of the condition of formula (15), spherical aberration becomes overcorrected, thus not preferred.

Inversely, below the lower limit of the condition of formula (15), the third lens group G3 comes into contact (or interferes with) the second lens group G2, and fails to correct spherical aberration.

The condition of formula (16) defines an appropriate range for the refractive power of the third lens group G3 being the correcting lens group.

Off the range defined by the upper limit and the lower limit of the condition of formula (16), the third lens group G3 will come into contact with the object-side lens group or the image-side lens group, i.e., the second lens group G2 or the fourth lens group G4 before fully correcting aberrations.

Above the upper limit of the condition of formula (16), correction of chromatic aberration becomes insufficient, thus being inconvenient.

Inversely, below the lower limit of the condition of formula (16), spherical aberration becomes overcorrected, thus being inconvenient.

The condition of formula (17) defines an appropriate range for the object-side and image-side axial air spaces d13 and d16 of the third lens group G3 being the correcting lens group.

Off the range defined by the upper limit and the lower limit of the condition of formula (17), the axial air spaces become too narrow or too wide, resulting in destroying balancing of aberrations.

In order to achieve better imaging performance, specifically the flatness of the image plane, the objective lens system of the third embodiment preferably further satisfies the following condition of formula (18) in addition to the above conditions.

$$6 < |f12/F| + |f42/F| < 9 \qquad (18)$$

In the above formula, f12: a focal length of the lens L12,
f42: a focal length of the lens L42.

The condition of formula (18) defines an appropriate range for the refractive power of the lens L12 with the concave surface opposed to the object side in the first lens group G1 and the refractive power of the negative lens L42 in the fourth lens group G4, thus determining the condition concerning the flatness of the image plane.

Above the upper limit of the condition of formula (18), the curvature of field becomes overcorrected, thus being not preferred.

Inversely, below the lower limit of the condition of formula (18), the magnification becomes too large, so as to increase the total lens length, thus being inconvenient.

The present invention will become more fully understood from the detailed description given hereinbelow and the accompanying drawings which are given by way of illustration only, and thus are not to be considered as limiting the present invention.

Further scope of applicability of the present invention will become apparent from the detailed description given hereinafter. However, it should be understood that the detailed description and specific examples, while indicating preferred embodiments of the invention, are given by way of illustration only, since various changes and modifications within the spirit and scope of the invention will become apparent to those skilled in the art from this detailed description.

BRIEF DESCRIPTION OF THE DRAWINGS

FIG. 4 is a drawing to show a first lens layout in the first embodiment of the objective lens system according to the present invention;

FIGS. 20A–20C are drawings to show aberrations of the third embodiment having the first lens layout shown in FIG. 16 and using water as a liquid;

FIGS. 21A–21C are drawings to show aberrations of the third embodiment having the first lens layout shown in FIG. 16 and using glycerin as a liquid;

FIGS. 22A–22C are drawings to show aberrations of the third embodiment having the first lens layout shown in FIG. 16 and using oil as a liquid;

FIGS. 24A–24C are drawings to show aberrations of the third embodiment having the second lens layout shown in FIG. 23 and using water as a liquid;

FIGS. 25A–25C are drawings to show aberrations of the third embodiment having the second lens layout shown in FIG. 23 and using glycerin as a liquid; and FIGS. 26A–26C are drawings to show aberrations of the third embodiment having the second lens layout shown in FIG. 23 and using oil as a liquid.

DETAILED DESCRIPTION OF THE PREFERRED EMBODIMENTS

Figure 1:
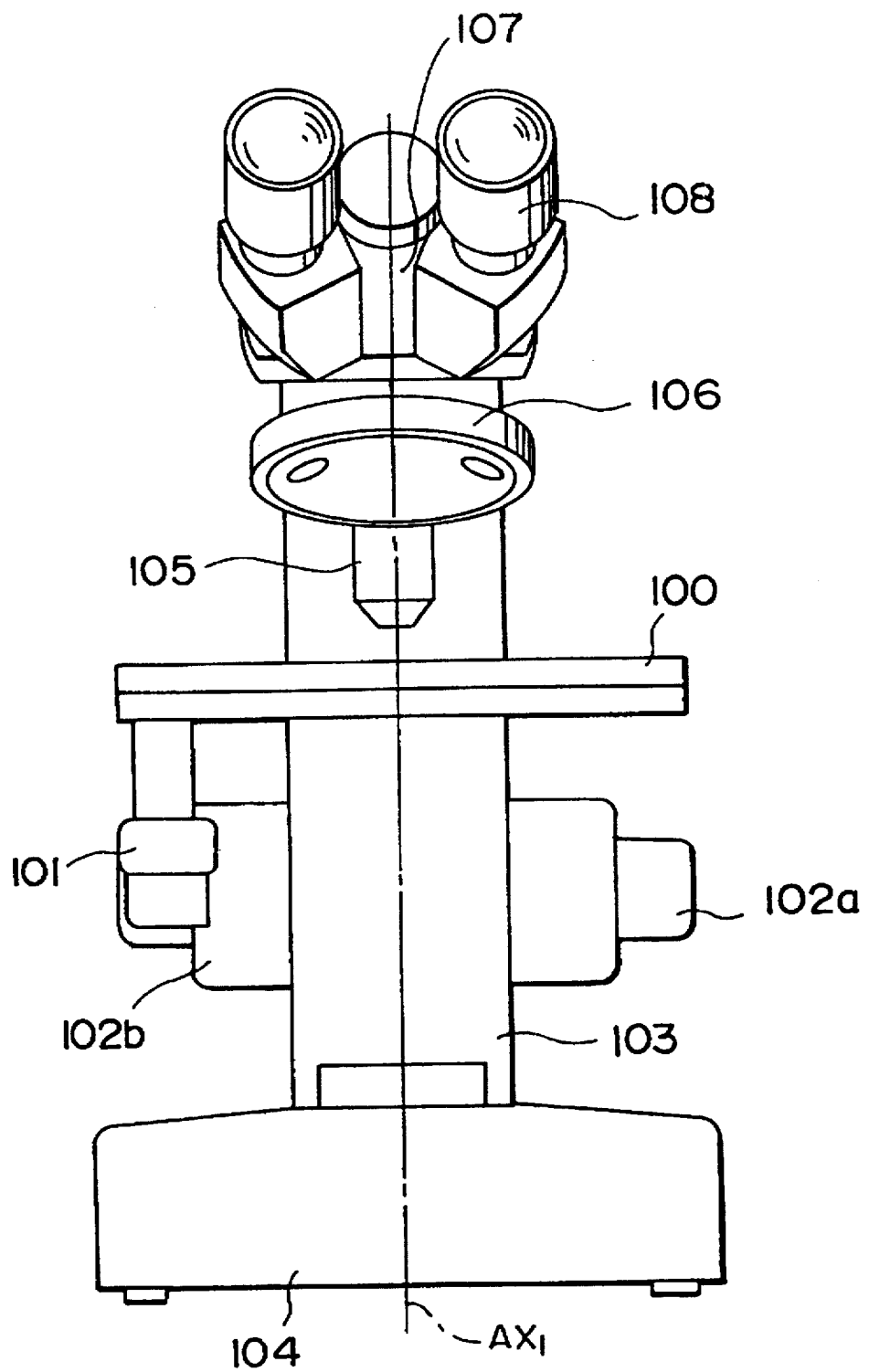
FIG. 1 is a drawing to show the basic structure of a microscope to which the objective lens system according to the present invention can be applied.

The objective lens system according to the present invention will be explained by reference to FIGS. 1 to 26. FIG. 1 is a drawing to show an example of the structure of a microscope to which the objective lens system according to the present invention can be applied. This microscope is arranged to be used on desktop, and is so arranged that at least the objective lens system 105 is mounted on the revolver 106 and the microscope has the lens barrel 107 for holding the optical system including the objective lens system 105, the stage 100 having the main surface on which a sample, being an observed object, can be placed, the stand 103 for supporting the lens barrel 107 and stage 100, and the optical adjusting mechanism for adjusting relative positions of the objective lens system 105 and stage 100. An observation optical system including the objective lens system 105 and an eyepiece 1 08 makes an image of the sample observable. The stand 103 supporting the above stage 100 is stably fixed on the base 104.

The above optical adjusting mechanism includes handles 101, 102a, 102b. When the handle 101 provided on the back face of stage 100 is rotated, the adjusting mechanism moves the sample. When the handles 102a, 102b set left and right of the stand 103 are rotated, the above movable stage 100 is moved in a direction perpendicular to the optical axis $AX_1$.

Known examples of the microscopes to which the objective lens system according to the present invention can be applied are those disclosed in U.S. Pat. Nos. 5,296,962, 5,172,265, 3,827,811, 4,946,265, Japanese Laid-open Patent Applications No. 4-304411 and No. 1-154016, Japanese Laid-open Utility Model Application No. 3-49516, and Japanese Patent Publication No. 57-13816. Further, known examples of inverted microscopes are those disclosed in U.S. Pat. No. 4,685,776, and Japanese Laid-open Patent Applications No. 60-53915 and No. 3-46610.

Figure 2:
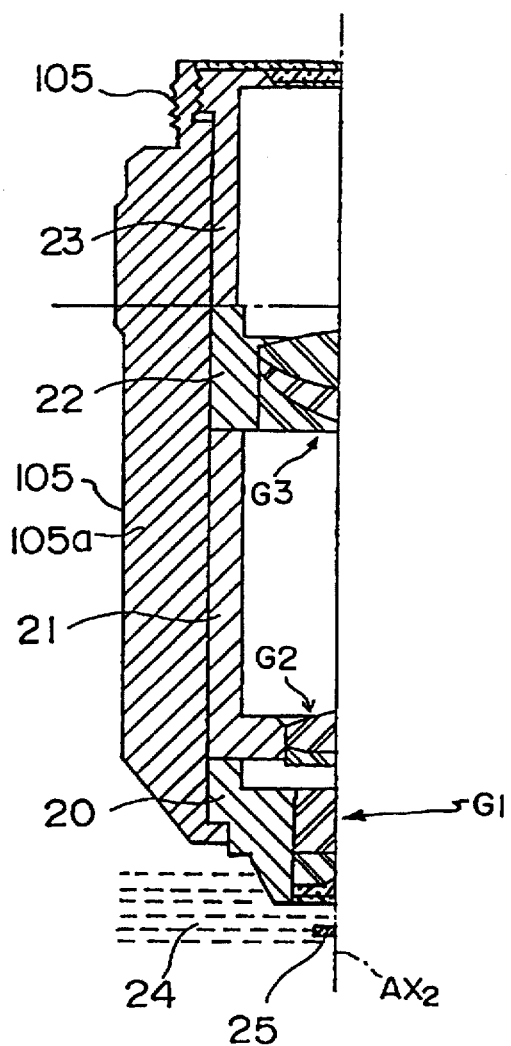
FIG. 2 is a drawing, partly in cross section, to show an embodiment of the immersion microscope objective to which the objective lens system according to the present invention is applied.

Next shown in FIG. 2 is the structure of the objective main body having the lens layout shown in FIG. 4 as the objective lens system according to the present invention. The first lens group G1 of this objective lens system is housed in a lens barrel 105a as held by a support frame 20. The second lens group G2 is housed in the lens barrel 105a as supported by a support frame 21. The third lens group G3 is housed in the lens barrel 105a as supported by a support frame 22. A fixing member 23 can also be arranged in the lens barrel 105a in order to prevent the above lens groups G1, G2, G3 from deviating in the direction of the optical axis AX2. Thread grooves 105b are provided on one end of the lens barrel 105a, whereby the objective lens system 105 can be mounted on the above microscope. Upon observation, the other end of the lens barrel 105a is immersed in a liquid 24 in which a sample 25 is present. A general structure for holding an objective lens system is described in the bulletin of Japanese Laid-open Utility Model Application No. 3-31712.

Figure 3:
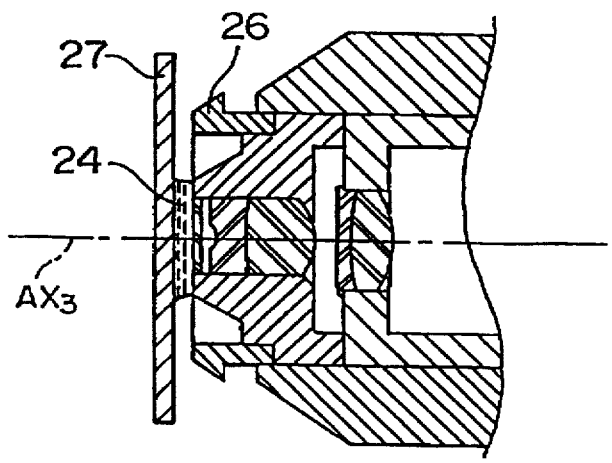
FIG. 3 is a cross section of a tip portion of another embodiment of the immersion microscope objective to which the objective lens system according to the present invention is applied.

Further, as shown in FIG. 3, a liquid holding portion 26 may be provided so as to surround the tip end (a portion in contact with the liquid 24) of the objective lens system 105 according to the present invention. This liquid holding portion 26 functions to hold the liquid leaking through between a specimen 27 and the objective lens 105 when the objective lens system 105 is brought to the vicinity of the specimen 27. This can secure only a necessary amount of the liquid held between the specimen 27 and the lens system 105 upon immersion. In the drawing, AX3 represents the optical axis of the lens system 105. The structure shown in FIG. 3 is disclosed in detail in the bulletin of Japanese Laid-open Patent Application No. 5-60981, and particularly, this structure is suitable for inverted microscopes as described above.

The objective lens system of the first embodiment is provided with the first lens group G1 having a plane-parallel plate L11 consisting of two surfaces substantially parallel to each other and a cemented lens with a concave surface opposed to the object side and having a negative refractive power as a whole, the second lens group G2 having a positive refractive power, and the third lens group G3 having a positive refractive power in order from the object side to the image side.

Embodiment 1-1

FIG. 4 is a drawing to show the first lens layout of the objective lens system in the first embodiment of the present invention. In the drawing, AX4 represents the optical axis of the objective lens system, P1 the object plane, arrow C a direction indicating the object side of the objective lens system, and arrow D a direction indicating the image side of the objective lens system.

The objective lens system as illustrated is composed of, in order from the object side toward the image side, the first lens group G1 composed of a plane-parallel plate L11, and a cemented lens of a biconcave lens L12 and a biconvex lens L13, the second lens group G2 composed of a positive cemented lens of a negative meniscus lens L21 with a convex surface opposed to the object side and a biconvex lens L22, and the third lens group G3 composed of a positive cemented lens of a negative meniscus lens L31 with a convex surface opposed to the object side, a positive meniscus lens L32 with a convex surface opposed to the object side, and a biconvex lens L33.

Next Table 1-1 lists values of specifications in the first embodiment (Embodiment 1-1) of the first lens layout shown in FIG. 4. In Table 1-1, f represents the focal length, N.A. the numerical aperture, B the magnification, and W.D. the working distance.

Further, numerals in the left end column are orders of respective lens surfaces from the object side, r radii of curvatures of the respective lens surfaces, d surface separations of the respective lenses, n and ν refractive indices and Abbe numbers, respectively, for the d-line (λ=587.6 nm).

TABLE 1-1 f = 1.0 mm, N.A. = 0.4, B = −10.0, W.D. = 0.02

| | r | d | ν | n |
|---|---|---|---|---|
| 1 | ∞ | 0.03 | 67.7 | 1.45847 |
| 2 | ∞ | 0.02 | | |
| 3 | −0.313 | 0.16 | 38.1 | 1.60342 |
| 4 | 2.234 | 0.32 | 82.6 | 1.49782 |
| 5 | −0.428 | 0.10 | | |
| 6 | 24.719 | 0.06 | 36.3 | 1.62004 |
| 7 | 1.008 | 0.21 | 82.6 | 1.49782 |
| 8 | −0.663 | 1.38 | | |
| 9 | 4.095 | 0.06 | 53.6 | 1.54739 |
| 10 | 0.567 | 0.15 | 41.5 | 1.57501 |
| 11 | 0.770 | 0.29 | 95.6 | 1.43388 |
| 12 | −1.231 | | | |

(Correspondent values to the conditions)

(1) |(N1a · F)/r1| = 0
(2) |(N1a · F)/r2| = 0
(3) |r3/(N1b · F)| = 0.195
(4) f3/F = 2.879
(5) |(N3b − N3a) · F/r10| = 0.049
(6) |N3a − N3b| = 0.028

Figure 5A:
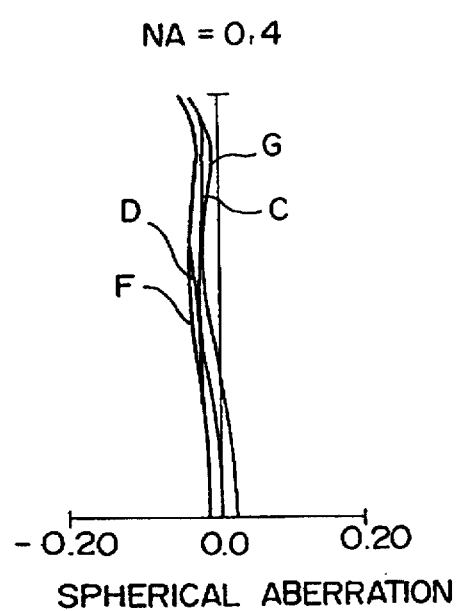
FIGS. 5A and 5B are drawings to show aberrations of the first embodiment having the first lens layout shown in FIG. 4 and using oil as a liquid.
Figure 5B:
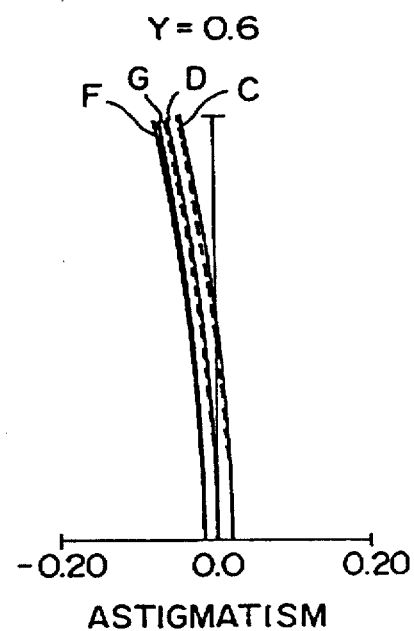
Figure 6A:
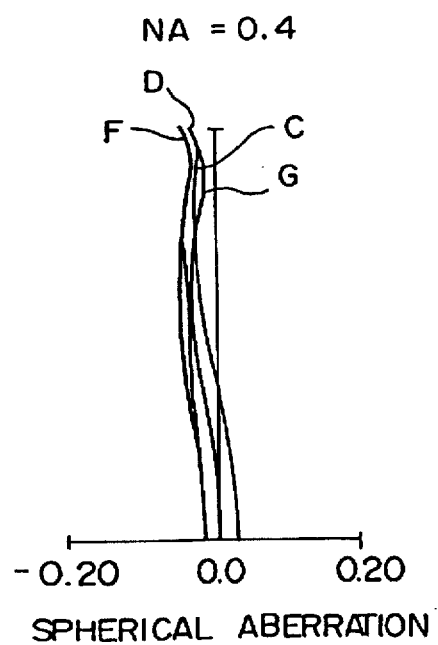
FIGS. 6A and 6B are drawings to show aberrations of the first embodiment having the first lens layout shown in FIG. 4 and using glycerin as a liquid.
Figure 6B:
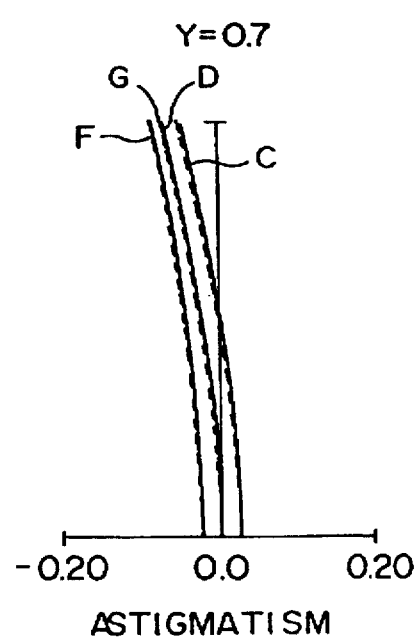
Figure 7A:
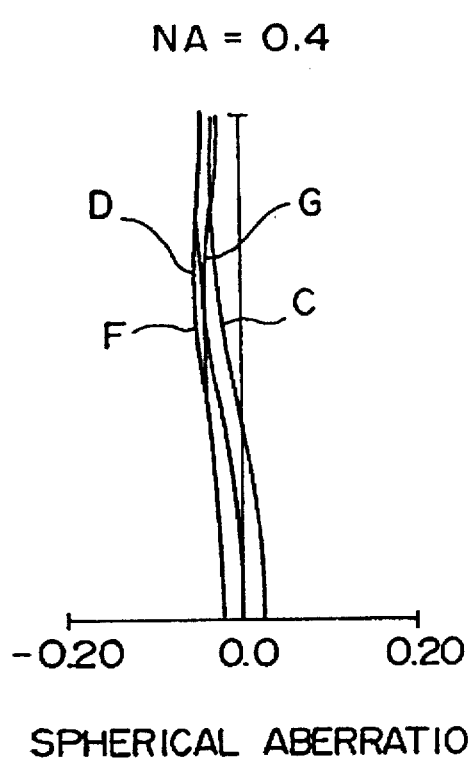
FIGS. 7A and 7B are drawings to show aberrations of the first embodiment having the first lens layout shown in FIG. 4 and using water as a liquid.
Figure 7B:
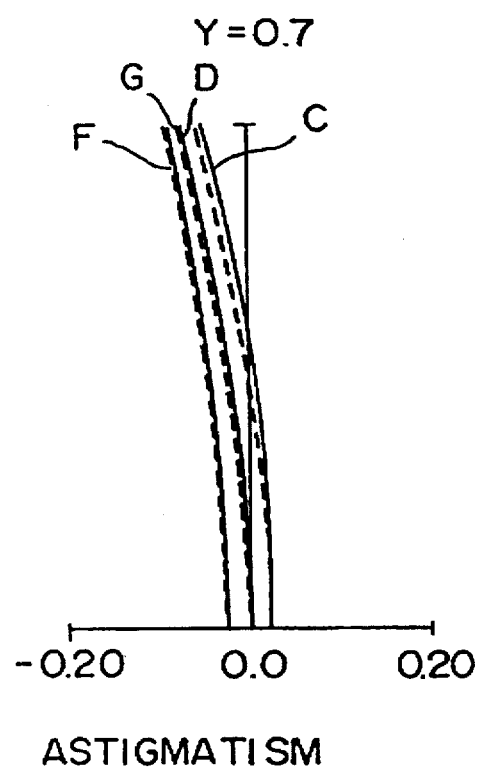

FIG. 5A to FIG. 7B are aberration diagrams of this Embodiment 1-1. Specifically, FIGS. 5A and 5B show spherical aberration and astigmatism of the objective lens system, in the use of oil (refractive index n=1.51536). FIGS. 6A and 6B show spherical aberration and astigmatism of the objective lens system in the use of glycerin (refractive index n=1.47300). FIGS. 7A and 7B show spherical aberration and astigmatism of the objective lens system in the use of water (refractive index n=1.33306).

In the aberration diagrams, NA represents the numerical aperture, Y the image height, D the d-line (λ=587.6 nm), G the g-line (λ=435.8 nm), C the C-line (λ=656.3 nm), and F the F-line (λ=486.1 nm).

In the aberration diagrams to show astigmatism, solid lines represent sagittal image surfaces while dashed lines meridional image surfaces.

As apparent from the aberration diagrams, it is understood that aberrations are well corrected with the liquids having the refractive indices ranging from about 1.6 to about 1.3, such as oil, glycerin, and water.

Embodiment 1-2

Figure 8:
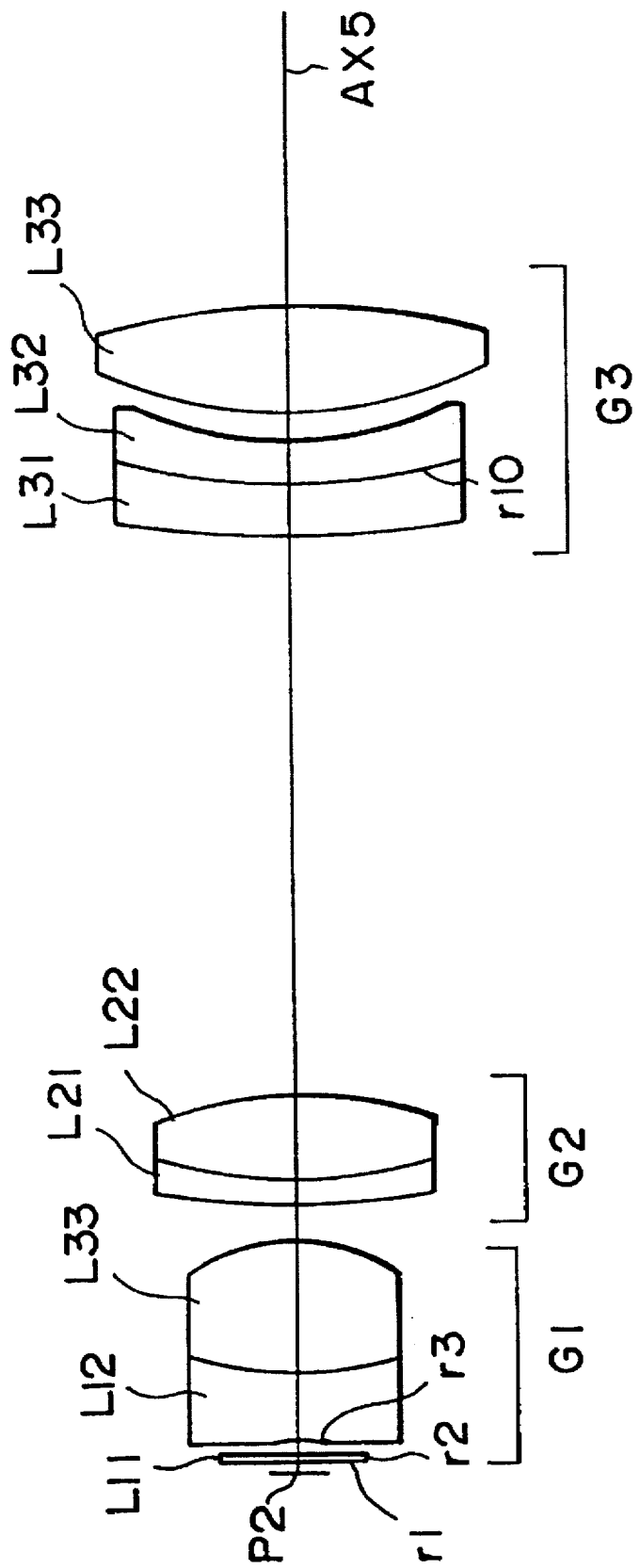
FIG. 8 is a drawing to show a second lens layout in the first embodiment of the objective lens system according to the present invention.

FIG. 8 is a drawing to show the second lens layout of the objective lens system in the first embodiment of the present invention. In the drawing, AX5 represents the optical axis of the objective lens system and P2 the object plane. The object side and the image side of the objective lens system are coincident with those of the objective lens system shown in FIG. 4.

The objective lens system as illustrated is composed of, in order from the object side to the image side, the first lens group G1 composed of a plane-parallel plate L11 and a cemented lens of a biconcave lens L12 and a biconvex lens L13, the second lens group G2 composed of a positive cemented lens of a negative meniscus lens L21 with a convex surface opposed to the object side and a biconvex lens L22, and the third lens group G3 composed of a negative cemented lens of a negative meniscus lens L31 with a convex surface opposed to the object side and a negative meniscus lens L32 with a convex surface opposed to the object side, and a biconvex lens L33.

Next Table 1-2 lists values of specifications in the first embodiment (Embodiment 1-2) of the second lens layout shown in FIG. 8. In Table 1-2, f represents the focal length, N. A. the numerical aperture, B the magnification, and W. D. the working distance.

Further, numerals in the left end column are orders of respective lens surfaces from the object side, r radii of curvatures of the respective lens surfaces, d surface separations of the respective lenses, n and ν refractive indices and Abbe numbers, respectively, for the d-line (λ=587.6 nm).

TABLE 1-2 f = 1.0 mm, N.A. = 0.4, B = −10.0, W.D. = 0.02

| | r | d | ν | n |
|---|---|---|---|---|
| 1 | ∞ | 0.03 | 67.7 | 1.45847 |
| 2 | ∞ | 0.02 | | |
| 3 | −0.284 | 0.16 | 35.5 | 1.59507 |
| 4 | 0.774 | 0.32 | 82.6 | 1.49782 |
| 5 | −0.438 | 0.10 | | |
| 6 | 2.461 | 0.07 | 36.3 | 1.62004 |
| 7 | 1.323 | 0.21 | 82.6 | 1.49782 |
| 8 | −0.801 | 1.37 | | |
| 9 | 2.448 | 0.13 | 44.4 | 1.61266 |
| 10 | 1.290 | 0.11 | 46.5 | 1.58267 |
| 11 | 0.890 | 0.07 | | |
| 12 | 0.993 | 0.26 | 95.6 | 1.43388 |
| 13 | −1.414 | | | |

(Correspondent values to the conditions)

(1) |(N1a · F)/r1| = 0
(2) |(N1a · F)/r2| = 0
(3) |r3/(N1b · F)| = 0.178
(4) f3/F = 3.164
(5) |(N3b − N3a) · F/r10| = 0.023
(6) |N3a − N3b| = 0.030

Figure 9A:
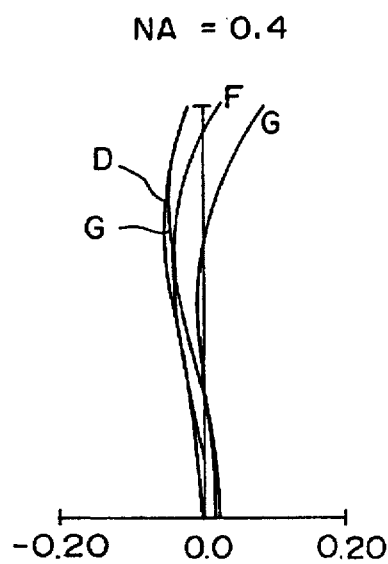
FIGS. 9A and 9B are drawings to show aberrations of the first embodiment having the second lens layout shown in FIG. 8 and using oil as a liquid.
Figure 9B:
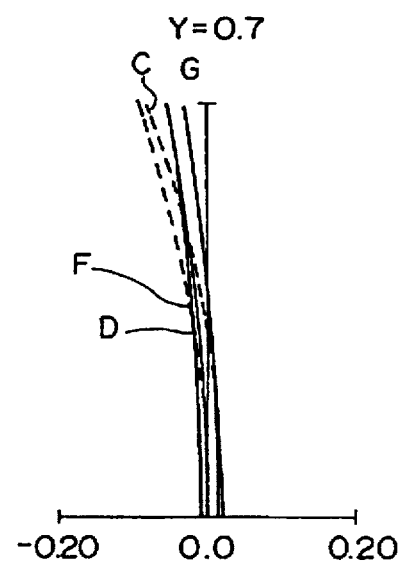
Figure 10A:
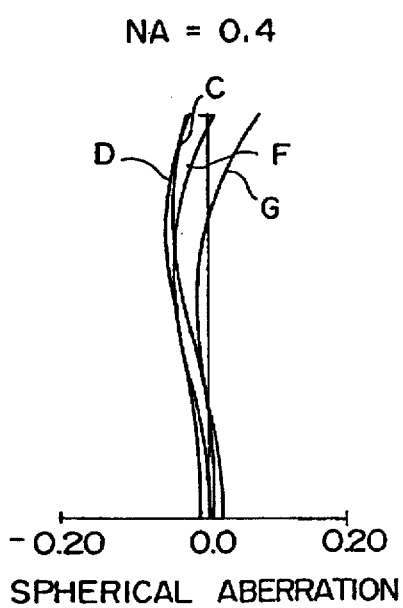
FIGS. 10A and 10B are drawings to show aberrations of the first embodiment having the second lens layout shown in FIG. 8 and using glycerin as a liquid.
Figure 10B:
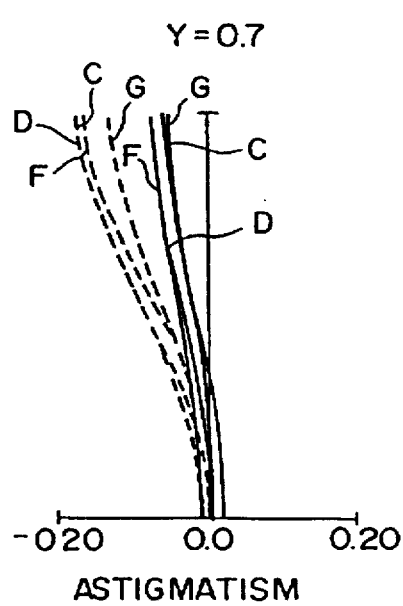
Figure 11A:
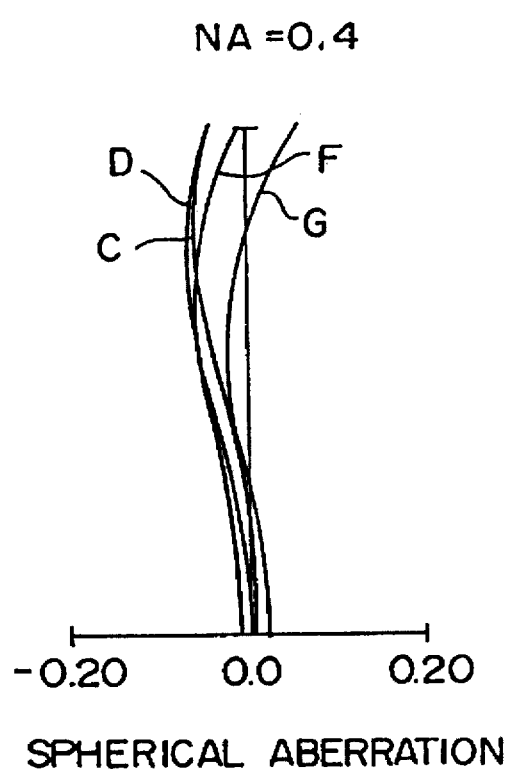
FIGS. 11A and 11B are drawings to show aberrations of the first embodiment having the second lens layout shown in FIG. 8 and using water as a liquid.
Figure 11B:
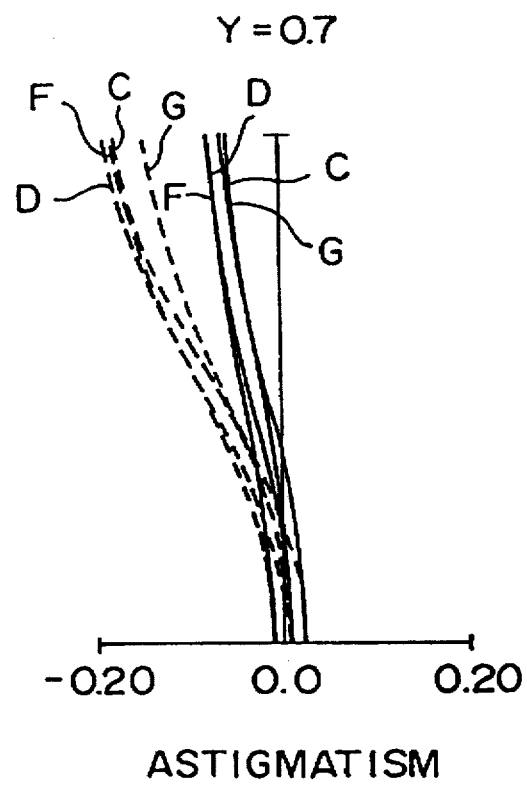

FIG. 9A to FIG. 11B are aberration diagrams of this Embodiment 1-2. Specifically, FIGS. 9A and 9B show spherical aberration and astigmatism of the objective lens system of FIG. 8 in the use of oil (refractive index n=1.51536). FIGS. 10A and 10B show spherical aberration and astigmatism of the objective lens system of FIG. 8 in the use of glycerin (refractive index n=1.47300). FIGS. 11A and 11B show spherical aberration and astigmatism of the objective lens system of FIG. 8 in the use of water (refractive index n=1.33306).

In the aberration diagrams, NA represents the numerical aperture, Y the image height, D the d-line (λ=587.6 nm), G the g-line (λ=435.8 nm), C the C-line (λ=656.3 nm), and F the F-line (λ=486.1 nm).

In the aberration diagrams to show astigmatism, solid lines represent sagittal image surfaces while dashed lines meridional image surfaces.

As apparent from the aberration diagrams, it is understood that aberrations are well corrected with the liquids having the refractive indices ranging from about 1.6 to about 1.3, such as oil, glycerin, and water.

If the above first embodiment having the first or second lens layout (Embodiment 1-1 or 1-2) is modified in such a manner that a phase film is provided on the object-side interface out of the two interfaces in the third lens group G3, it becomes capable of being used as an objective for fluorescence.

As described above, the first embodiment can improve the flatness of the image plane in the immersion microscope objective for common use to water immersion and oil immersion without using an embedded lens, can be produced cheaply by the conventional machining techniques, and can expect a considerable cost reduction and stability of quality.

As described, the first embodiment can realize the immersion planapochromat-grade microscope objective having a magnification of about 10× and a numerical aperture (NA) of about 0.4, well corrected for chromatic aberration, having high flatness of the image plane, and maintaining excellent imaging performance.

Next, the objective lens system of the second embodiment according to the present invention is provided with the first lens group G1 having a plane-parallel plate L11 consisting of two surfaces substantially parallel to each other, a lens L12 with a concave surface opposed to the object side, and a positive meniscus lens L13, the second lens group G2 having two cemented lenses and having a positive refractive power as a whole, the third lens group G3 having a cemented lens of a negative lens L31 and a positive lens L32 and having a negative refractive power as a whole, and the fourth lens group G4 having a cemented lens of a positive lens L41 and a negative lens L42 and having a negative refractive power as a whole.

Embodiment 2-1

Figure 12:
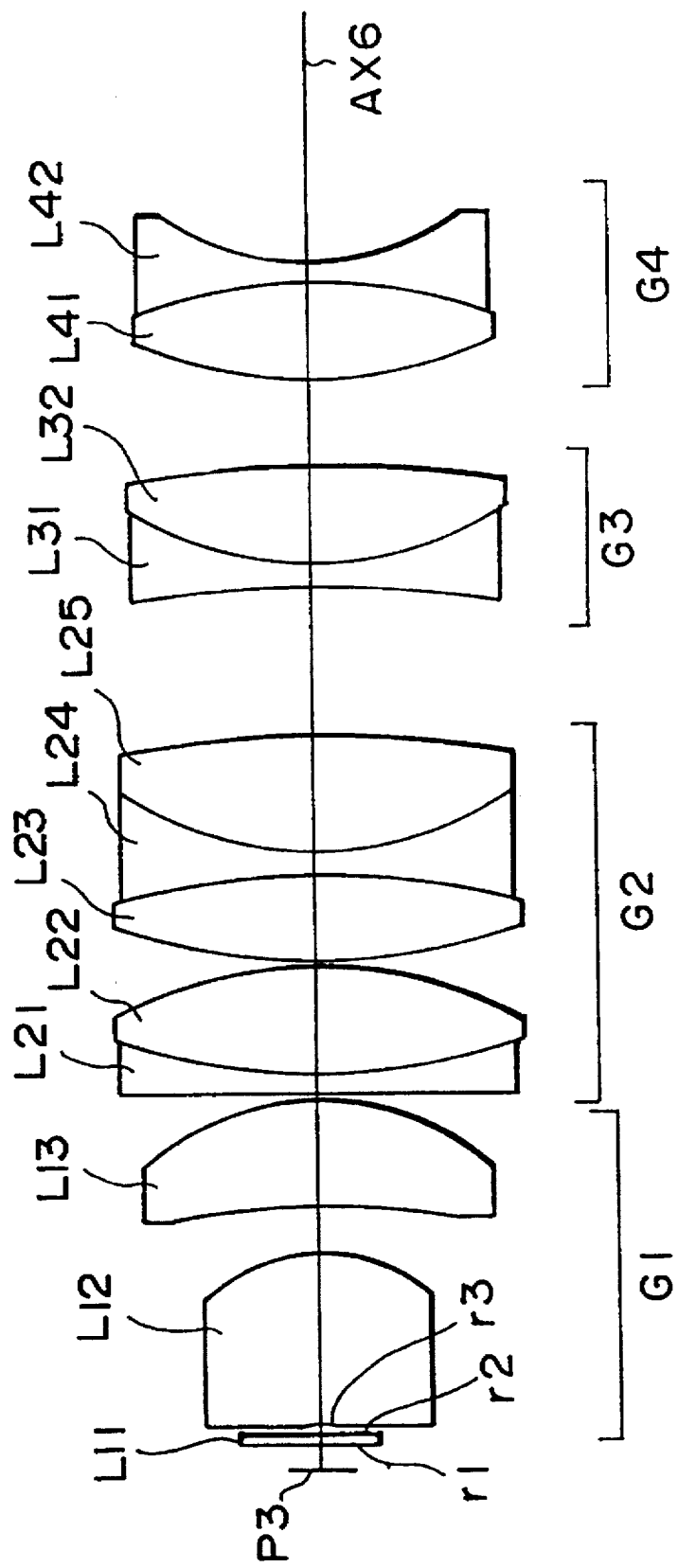
FIG. 12 is a drawing to show a first lens layout in the second embodiment of the objective lens system according to the present invention.
Figure 13:
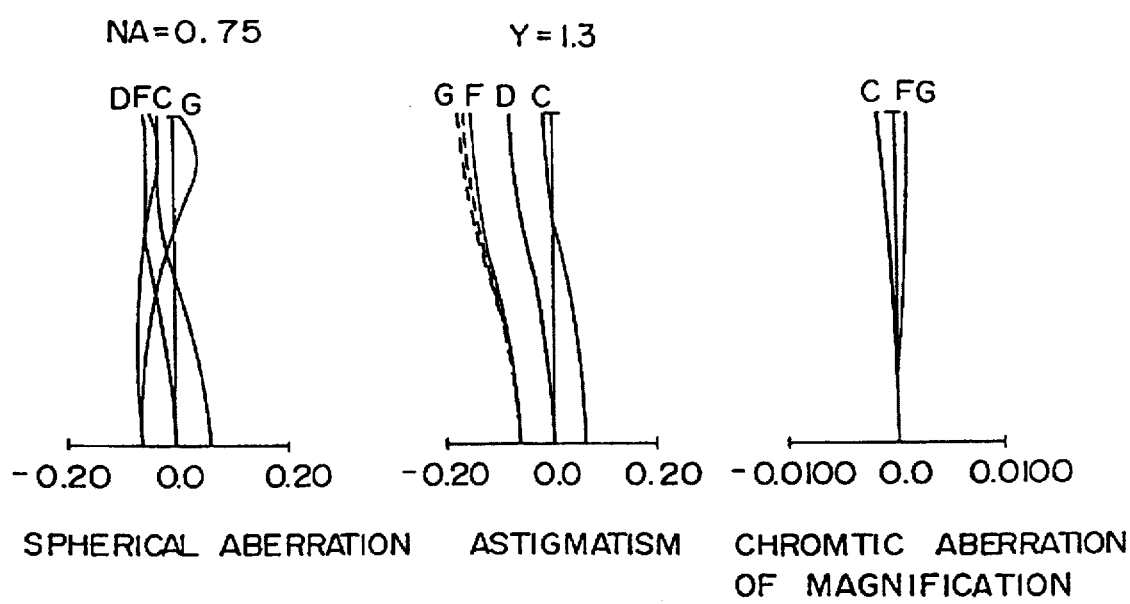
FIGS. 13A—13C are drawings to show aberrations of the second embodiment having the first lens layout shown in FIG. 12 and using oil as a liquid.

FIG. 12 is a drawing to show the first lens layout of the objective lens system in the second embodiment of the present invention. In the drawing, AX6 represents the optical axis of the objective lens system and P3 the object plane. The object side and the image side of the objective lens system are coincident with those of the objective lens system of FIG. 4.

The objective lens system as illustrated is composed of, in order from the object side to the image side, the first lens group G1 composed of a plane-parallel plate L11, a positive meniscus lens L12 with a concave surface opposed to the object side, and a positive meniscus lens L13 with a concave surface opposed to the object side, the second lens group G2 composed of a cemented lens of a negative meniscus lens L21 with a convex surface opposed to the object side and a biconvex lens L22, and a cemented lens of a biconvex lens L23, a biconcave lens L24, and a biconvex lens L25, the third lens group G3 composed of a cemented lens of a biconcave lens L31 and a biconvex lens L32, and the fourth lens group G4 composed of a cemented lens of a biconvex lens L41 and a biconcave lens L42.

Next Table 2-1 lists values of specifications in the second embodiment (Embodiment 2-1) of the first lens layout shown in FIG. 12. In Table 2-1, f represents the focal length, N.A. the numerical aperture, B the magnification, and W.D. the working distance.

Further, numerals in the left end column are orders of respective lens surfaces from the object side, r radii of curvatures of the respective lens surfaces, d surface separations of the respective lenses, n and ν refractive indices and Abbe numbers, respectively, for the d-line (λ=587.6 nm).

TABLE 2-1

| f = 1.0 mm, N.A. = 0.75, B = −20.0, W.D. = 0.03 | | | | |
|---|---|---|---|---|
| | r | d | ν | n |
| 1 | ∞ | 0.06 | 67.7 | 1.45847 |
| 2 | ∞ | 0.04 | | |
| 3 | −0.556 | 0.83 | 53.1 | 1.71951 |
| 4 | −0.812 | 0.25 | | |
| 5 | −3.594 | 0.50 | 82.6 | 1.49782 |
| 6 | −1.297 | 0.03 | | |
| 7 | 154.505 | 0.11 | 56.0 | 1.56883 |
| 8 | 2.688 | 0.53 | 82.6 | 1.49782 |
| 9 | −2.070 | 0.03 | | |
| 10 | 3.157 | 0.43 | 95.6 | 1.43388 |
| 11 | −3.157 | 0.11 | 36.3 | 1.62004 |
| 12 | 1.708 | 1.28 | 95.6 | 1.43388 |
| 13 | −4.277 | 0.72 | | |
| 14 | −5.369 | 0.12 | 53.6 | 1.54739 |
| 15 | 1.694 | 0.47 | 82.6 | 1.49782 |
| 16 | −4.693 | 0.41 | | |
| 17 | 2.267 | 0.45 | 36.3 | 1.62004 |
| 18 | −2.544 | 0.11 | 70.2 | 1.48749 |
| 19 | 1.325 | | | |

(Correspondent values to the conditions)

(7) |(N1a · F)/r1| = 0
(8) |(N1a · F)/r2| = 0
(9) |r3/(N1b · F)| = 0.323
(10) |f12/F| + |f42/F| = 8.5
(11) f2/F = 3.431

FIGS. 13A–13C are drawings to show aberrations (spherical aberration, astigmatism, and chromatic aberration of magnification) of the objective lens system in the use of oil (refractive index n=1.51536) in Embodiment 2-1 of FIG. 12.

In the aberration diagrams, NA represents the numerical aperture, Y the image height, D the d-line (λ=587.6 nm), G the g-line (λ=435.8 nm), C the C-line (λ=656.3 nm), and F the F-line (λ=486.1 nm).

In the aberration diagram to show astigmatism, solid lines represent sagittal image surfaces while dashed lines meridional image surfaces. In the aberration diagram to show chromatic aberration of magnification, the reference is the d-line (λ=587.6 nm).

As apparent from the aberration diagrams, it is understood that aberrations are well corrected in the present embodiment.

Embodiment 2-2

Figure 14:
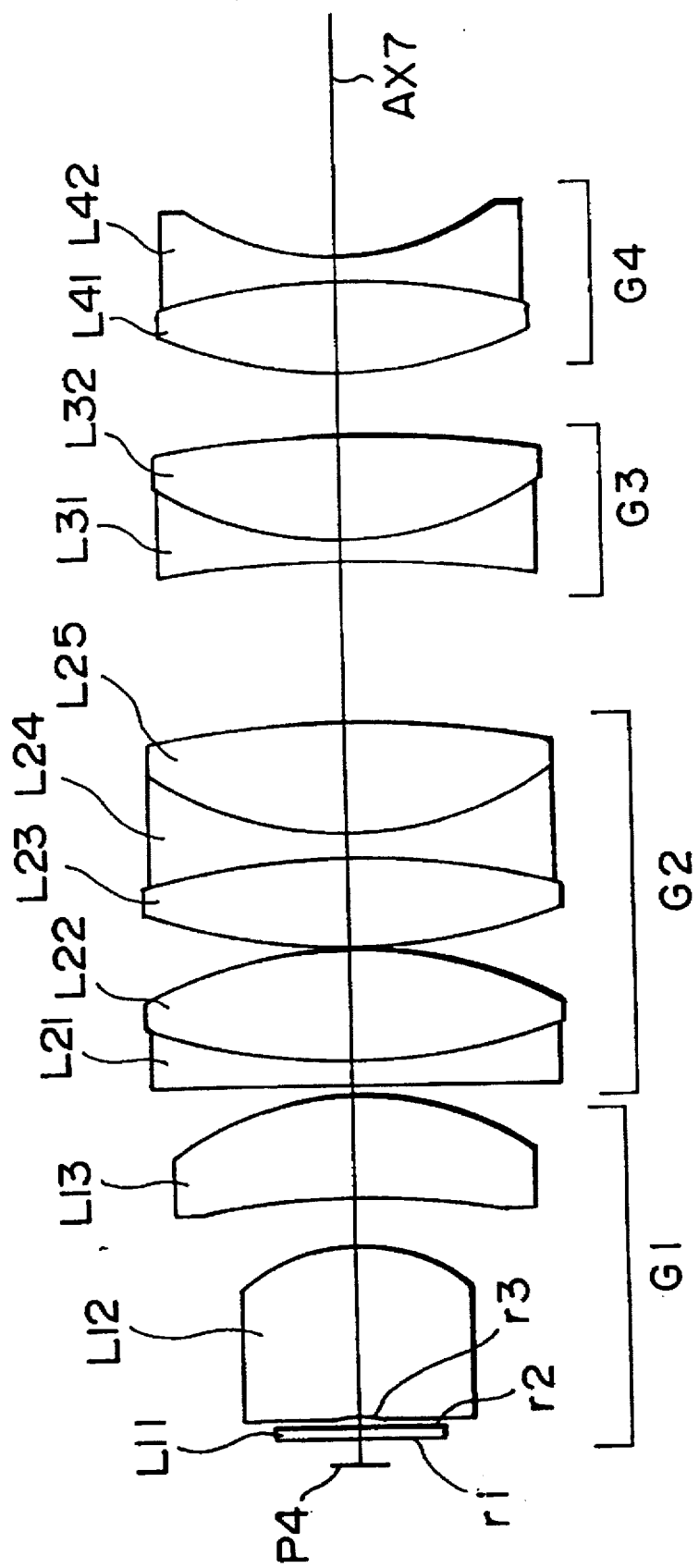
FIG. 14 is a drawing to show a second lens layout in the second embodiment of the objective lens system according to the present invention.

FIG. 14 is a drawing to show the second lens layout of the objective lens system in the second embodiment of the present invention. In the drawing, AX7 represents the optical axis of the objective lens system and P4 the object plane. The object side and the image side of the objective lens system are coincident with those of the objective lens system shown in FIG. 4.

The objective lens system as illustrated is composed of, in order from the object side toward the image side, the first lens group G1 composed of a plane-parallel plate L11, a positive meniscus lens L12 with a concave surface opposed to the object side, and a positive meniscus lens L13 with a concave surface opposed to the object side, the second lens group G2 composed of a cemented lens of a negative meniscus lens L21 with a convex surface opposed to the object side and a biconvex lens L22, and a cemented lens of a biconvex lens L23, a biconcave lens L24, and a biconvex lens L25, the third lens group G3 composed of a cemented lens of a biconcave lens L31 and a biconvex lens L32, and the fourth lens group G4 composed of a cemented lens of a biconvex lens L41 and a biconcave lens L42.

Next Table 2-2 lists values of specifications in the second embodiment (Embodiment 2-2) of the second lens layout shown in FIG. 14. In Table 2-2, f represents the focal length, N.A. the numerical aperture, B the magnification, and W.D. the working distance.

Further, numerals in the left end column are orders of respective lens surfaces from the object side, r radii of curvatures of the respective lens surfaces, d surface separations of the respective lenses, n and ν refractive indices and Abbe numbers, respectively, for the d-line (λ=587.6 nm).

TABLE 2-2 f = 1.0 mm, N.A. = 0.75, B = –20.0, W.D. = 0.03

| | r | d | ν | n |
|---|---|---|---|---|
| 1 | ∞ | 0.06 | 56.5 | 1.50137 |
| 2 | ∞ | 0.05 | | |
| 3 | –0.585 | 0.84 | 53.1 | 1.71951 |
| 4 | –0.811 | 0.23 | | |
| 5 | –3.584 | 0.51 | 82.6 | 1.49782 |
| 6 | –1.303 | 0.03 | | |
| 7 | 96.395 | 0.13 | 56.0 | 1.56883 |
| 8 | 2.766 | 0.53 | 82.6 | 1.49782 |
| 9 | –2.097 | 0.03 | | |
| 10 | 3.236 | 0.43 | 95.6 | 1.43388 |
| 11 | –3.066 | 0.11 | 36.3 | 1.62004 |
| 12 | 1.718 | 1.30 | 95.6 | 1.43388 |
| 13 | –4.139 | 0.77 | | |
| 14 | –5.435 | 0.14 | 53.6 | 1.54739 |
| 15 | 1.678 | 0.48 | 82.6 | 1.49782 |
| 16 | –4.681 | 0.28 | | |
| 17 | 2.304 | 0.44 | 36.3 | 1.62004 |
| 18 | –2.538 | 0.11 | 70.2 | 1.48749 |
| 19 | 1.341 | | | |

(Correspondent values to the conditions)

(7) |(N1a · F)/r1| = 0
(8) |(N1a · F)/r2| = 0
(9) |r3/(N1b · F)| = 0.340
(10) |f12/F| + |f42/F| = 7.1
(11) f2/F = 3.417

Figure 15A:
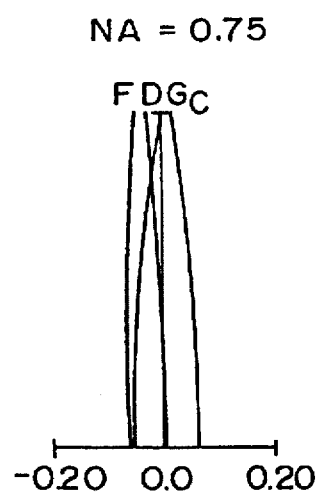
FIGS. 15A–15C are drawings to show aberrations of the second embodiment having the second lens layout shown in FIG. 14 and using oil as a liquid.
Figure 15B:
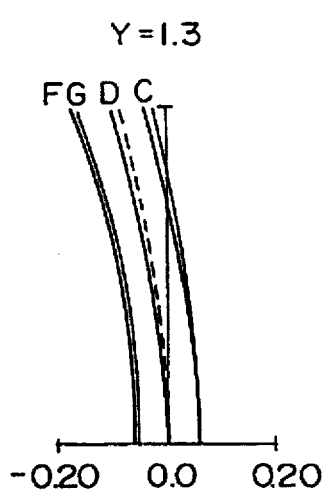
Figure 15C:
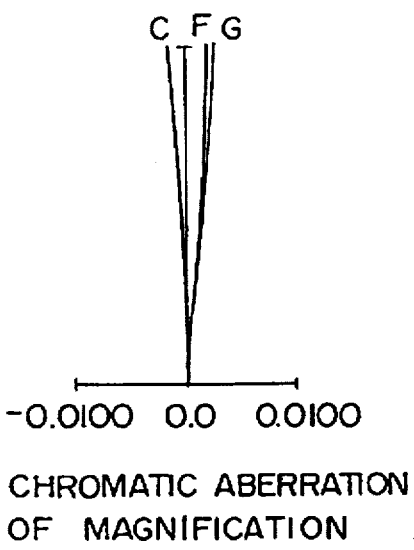

FIGS. 15A–15C are drawings to show aberrations (spherical aberration, astigmatism, and chromatic aberration of magnification) of the objective lens system in the use of oil (refractive index n=1.51536) in Embodiment 2-2 of FIG. 14.

In the aberration diagrams, NA represents the numerical aperture, Y the image height, D the d-line (λ=587.6 nm), G the g-line (λ=435.8 nm), C the C-line (λ=656.3 nm), and F the F-line (λ=486.1 nm).

In the aberration diagram to show astigmatism, solid lines represent sagittal image surfaces while dashed lines meridional image surfaces. In the aberration diagram to show chromatic aberration of magnification, the reference is the d-line (λ=587.6 nm).

As apparent from the aberration diagrams, it is understood that aberrations are well corrected in the present embodiment.

As described above, the second embodiment can improve the flatness of the image plane in the immersion microscope objective without using an embedded lens, can be produced cheaply by the conventional machining techniques, and can expect a considerable cost reduction and stability of quality.

As described, the second embodiment can realize the immersion planapochromat-grade microscope objective having a magnification of about 20× and a numerical aperture (NA) of about 0.75, well corrected for chromatic aberration, having high flatness of the image plane, and maintaining excellent imaging performance.

Next, the objective lens system of the third embodiment is provided with, in order from the object side toward the image side, the first lens group G1 having a plane-parallel plate L11 consisting of two surfaces substantially parallel to each other, a lens L12 with a concave surface opposed to the object side, and a positive meniscus lens L13, the second lens group G2 having two cemented lenses and having a positive refractive power as a whole, the third lens group G3 having a cemented lens of a negative lens L31 and a positive lens L32 and having a negative refractive power as a whole, the fourth lens group G4 having a cemented lens of a positive lens L41 and a negative lens L42 and having a negative refractive power as a whole, and a moving mechanism for moving the third lens group G3 along the optical axis. Particularly, the cemented lens of the third lens group G3 is shaped with a concave surface opposed to the object side.

Embodiment 3-1

Figure 16:
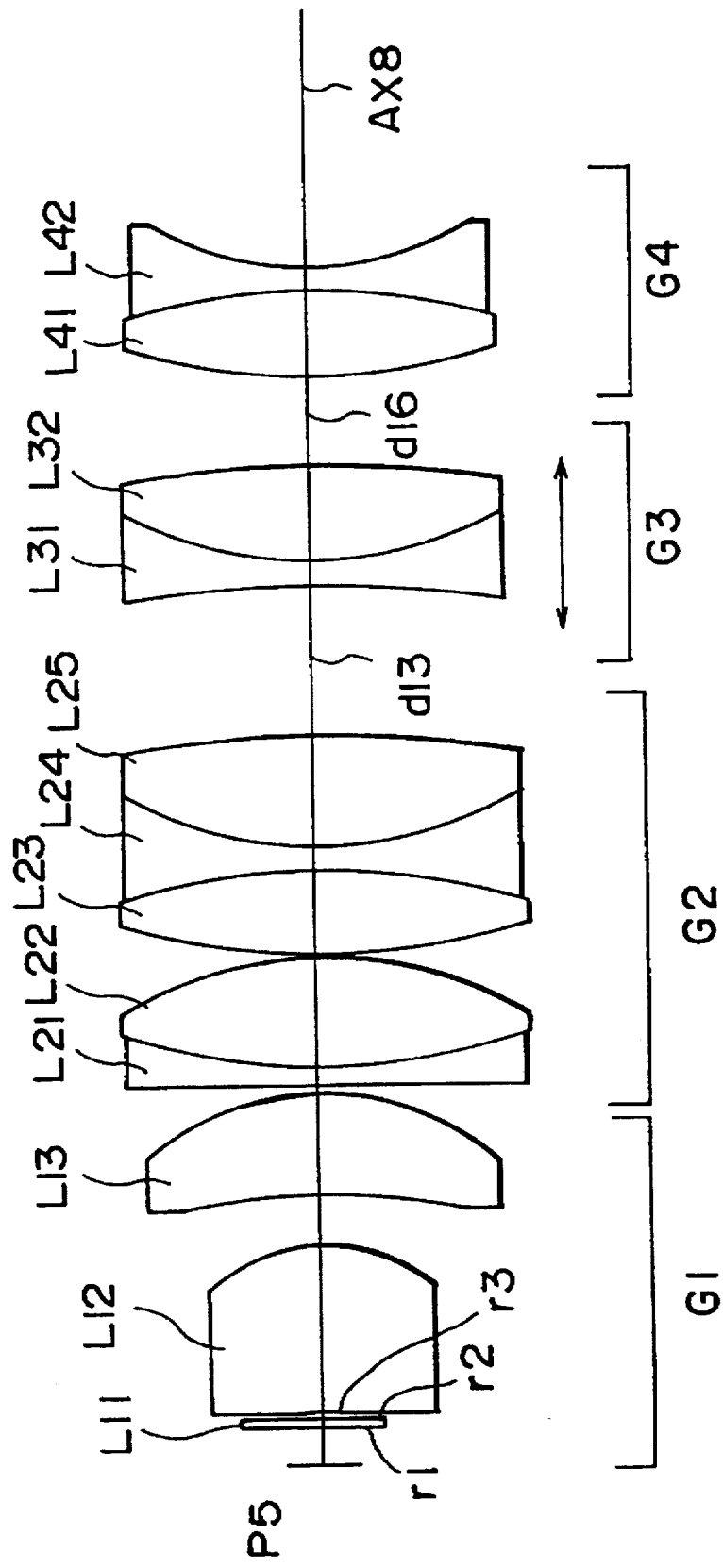
FIG. 16 is a drawing to show a first lens layout in the third embodiment of the objective lens system according to the present invention.

FIG. 16 is a drawing to show the first lens layout of the objective lens system in the third embodiment of the present invention. In the drawing, AX8 represents the optical axis of the objective lens system and P5 the object plane. The object side and the image side of the objective lens system are coincident with those of the objective lens system of FIG. 4.

The objective lens system as illustrated is composed of, in order from the object side to the image side, the first lens group G1 composed of a plane-parallel plate L11, a positive meniscus lens L12 with a concave surface opposed to the object side, and a positive meniscus lens L13 with a concave surface opposed to the object side, the second lens group G2 composed of a cemented lens of a negative meniscus lens L21 with a convex surface opposed to the object side and a biconvex lens L22, and a cemented lens of a biconvex lens L23, a biconcave lens L24, and a biconvex lens L25, the third lens group G3 composed of a cemented lens of a biconcave lens L31 and a biconvex lens L32, and the fourth lens group G4 composed of a cemented lens of a biconvex lens L41 and a biconcave lens L42.

Figure 17:
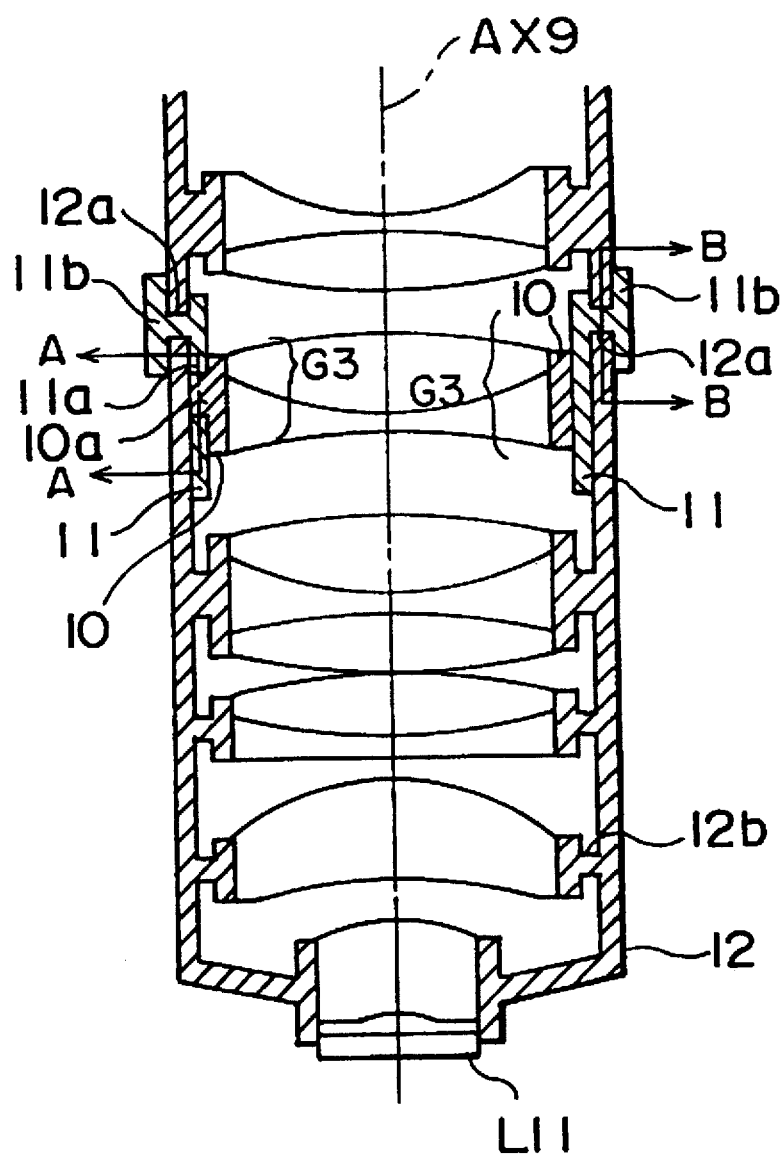
FIGS. 17 to 19 are drawings to show the structure of a lens moving mechanism for moving the third lens group along the optical axis in the objective lens system shown in FIG. 16.
Figure 18:
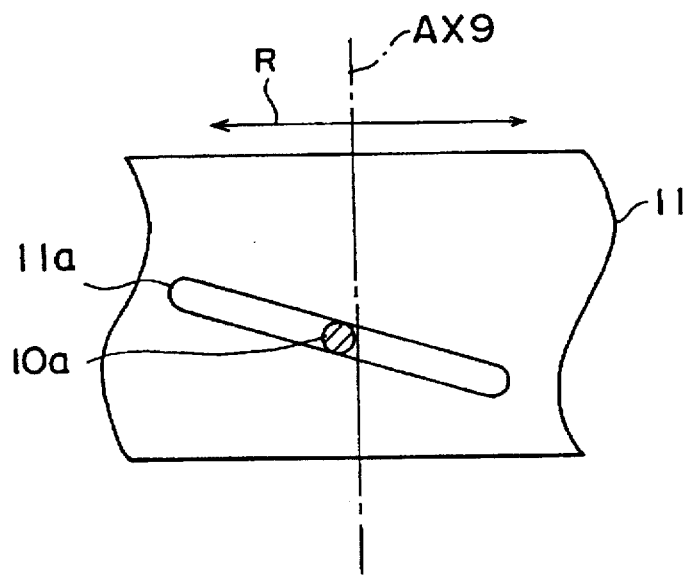
Figure 19:
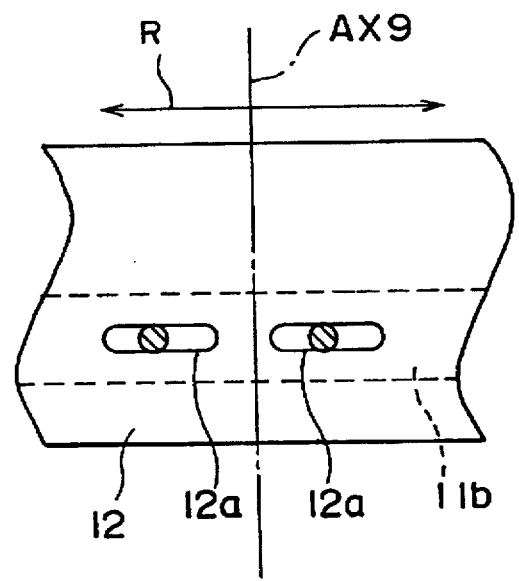

FIG. 17 to FIG. 19 are schematic drawings to show the moving mechanism. FIG. 18 is a cross section of the objective of FIG. 17 along A—A line, and FIG. 19 is a cross section of the objective of FIG. 17 along B—B line. In the drawings, AX9 represents the optical axis of the objective lens system.

In FIG. 17, only the third lens group G3 is arranged as movable along the direction of the optical axis AX9. This third lens group G3 is housed in a stationary barrel 12 as held by a holding member 10. A pin 10a is fixed to the holding member 10. Provided outside the holding member 10 is a cam member 11 having a guide groove 11a engaged with the pin 10a of the holding member 10. The cam member 11 is arranged as rotatable along the direction of rotation (arrow R) about the optical axis AX9.

As shown in FIG. 18, the guide groove 11a is obliquely arranged relative to the rotation direction R about the optical axis AX9, whereby it moves the pin 10a along the direction of the optical axis AX9 when the cam member 11 rotates along the rotation direction R about the optical axis AX9. Namely, rotation of the cam member 11 displaces the third lens group G3 along the direction of the optical axis AX9.

Further, returning to FIG. 17, the cam member 11 is provided with a rotary ring 11b for rotating the cam member 11. Here, the cam member 11 is located inside the stationary barrel 12 for holding the lens groups other than the third lens group G3 in a stationary state, and the rotary ring 11b integral with the cam member 11 is located outside the stationary barrel 12.

As shown in FIG. 19, the stationary barrel 12 is provided with guide grooves 12a extending in the rotation direction R about the optical axis AX9, and the above cam member 11 and rotary ring 11b rotate along the rotation direction R about the optical axis AX9 and along the guide grooves 12a.

Accordingly, when the rotary ring 11a located outside the stationary barrel 12 is rotated, the cam member 11 rotates to move the holding member 10 along the optical axis AX9, thereby in turn moving the third lens group G3 along the direction of the optical axis AX9.

Next Table 3-1 lists values of specifications in the third embodiment (Embodiment 3-1) of the first lens layout shown in FIG. 16. In Table 3-1, f represents the focal length, N.A. the numerical aperture, B the magnification, and W.D. the working distance.

Further, numerals in the left end column are orders of respective lens surfaces from the object side, r radii of curvatures of the respective lens surfaces, d surface separations of the respective lenses, n and ν refractive indices and Abbe numbers, respectively, for the d-line (λ=587.6 nm).

TABLE 3-1

| f = 1.0 mm, N.A. = 0.75, B = −20.0, W.D. = 0.03 | | | |
|---|---|---|---|
| r | d | ν | n |
| 1 | ∞ | 0.06 | 67.7 | 1.45847 |
| 2 | ∞ | 0.04 | | |
| 3 | −0.556 | 0.83 | 53.1 | 1.71951 |
| 4 | −0.812 | 0.25 | | |
| 5 | −3.594 | 0.50 | 82.6 | 1.49782 |
| 6 | −1.297 | 0.03 | | |
| 7 | 154.505 | 0.11 | 56.0 | 1.56883 |
| 8 | 2.688 | 0.53 | 82.6 | 1.49782 |
| 9 | −2.070 | 0.03 | | |
| 10 | 3.157 | 0.43 | 95.6 | 1.43388 |
| 11 | −3.157 | 0.11 | 36.3 | 1.62004 |
| 12 | 1.708 | 1.28 | 95.6 | 1.43388 |
| 13 | −4.277 | (d13 = variable) | | |
| 14 | −5.369 | 0.12 | 53.6 | 1.54739 |
| 15 | 1.694 | 0.47 | 82.6 | 1.49782 |
| 16 | −4.693 | (d16 = variable) | | |
| 17 | 2.267 | 0.45 | 36.3 | 1.62004 |
| 18 | −2.544 | 0.11 | 70.2 | 1.48749 |
| 19 | 1.325 | | | |

(Variable spaces for the respective liquids)

| Type of liquid | Index of refraction, n | d0 | d13 | d16 |
|---|---|---|---|---|
| water | 1.33306 | 0.03 | 0.11 | 1.00 |
| glycerin | 1.47300 | 0.03 | 0.57 | 0.54 |
| oil | 1.51536 | 0.03 | 0.71 | 0.40 |

(Correspondent values to the conditions)

(12) |(N1a · F)/r1| = 0
(13) |(N1a · F)/r2| = 0
(14) |(N1b · F)/r3| = 3.1
(15) d13/F (water) = 0.11
    d13/F (glycerin) = 0.57
    d13/F (oil) = 0.71
(16) |F/f3| = 0.02
(17) (d13 + d16)/F = 1.11
(18) |f12/F + f42/F| = 8.5

FIG. 20A to FIG. 22C are aberration diagrams of Embodiment 3-1. FIGS. 20A–20C are drawings to show aberrations (spherical aberration, astigmatism, and chromatic aberration of magnification) of the objective lens system in the use of water (refractive index n=1.33306). FIGS. 21A–21C are drawings to show aberrations (spherical aberration, astigmatism, and chromatic aberration of magnification) of the objective lens system in the use of glycerin (refractive index n=1.47300). FIGS. 22A–22C are drawings to show aberrations (spherical aberration, astigmatism, and chromatic aberration of magnification) of the objective lens system in the use of oil (refractive index n=1.51536).

In the aberration diagrams, NA represents the numerical aperture, Y the image height, D the d-line (λ=587.6 nm), G the g-line (λ=435.8 nm), C the C-line (λ=656.3 nm), and F the F-line (λ=486.1 nm).

In the aberration diagrams to show astigmatism, solid lines represent sagittal image surfaces while dashed lines meridional image surfaces. In the diagrams to show chromatic aberration of magnification, the reference is the d-line (λ=587.6 nm).

As apparent from the aberration diagrams, it is understood that aberrations are well corrected with the liquids having the refractive indices ranging from about 1.6 to about 1.3, such as oil, glycerin, and water.

Embodiment 3-2

Figure 23:
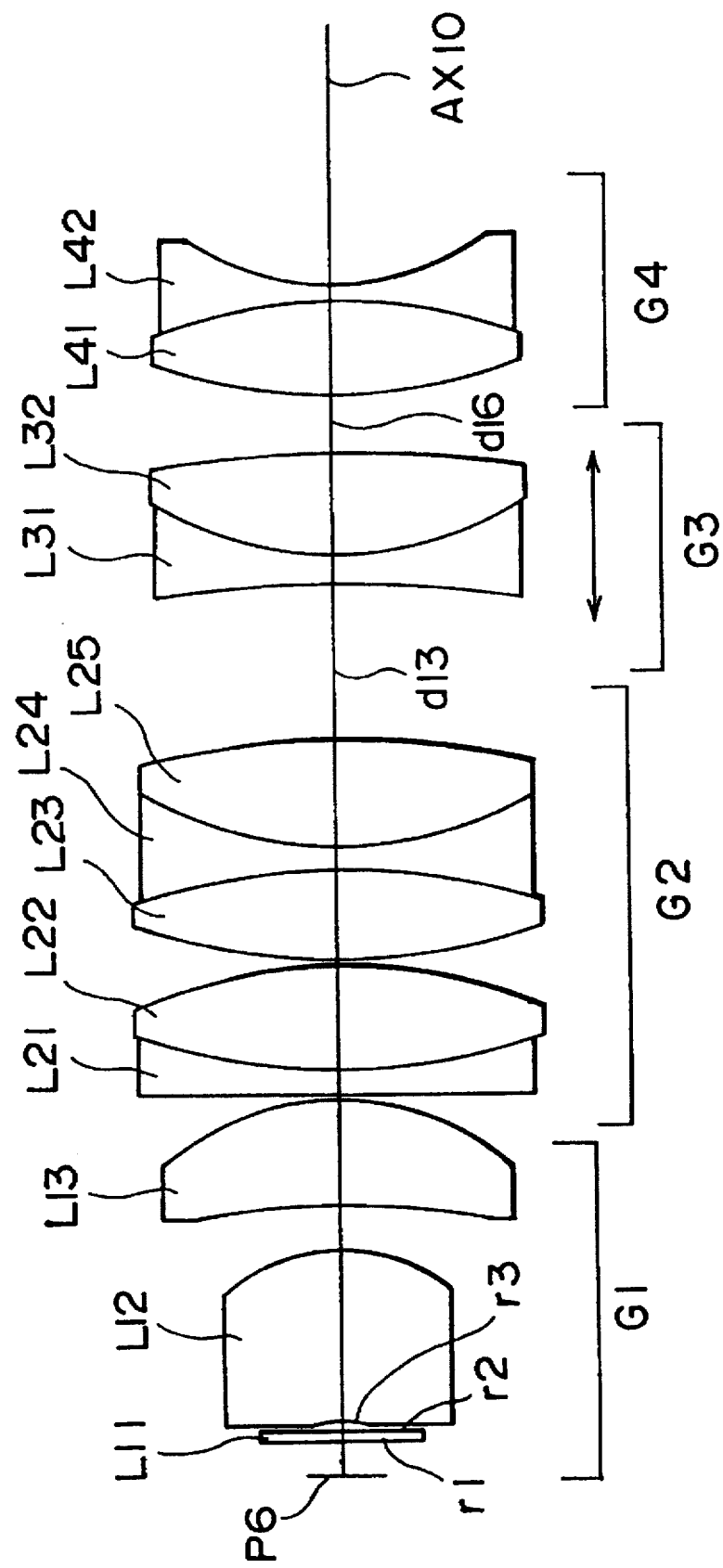
FIG. 23 is a drawing to show a second lens layout in the third embodiment of the objective lens system according to the present invention.

FIG. 23 is a drawing to show the second lens layout of the objective lens system in the third embodiment of the present invention. The objective lens system of Embodiment 3-2 is also provided with the moving mechanism for moving the third lens group G3 shown in FIG. 17 to FIG. 19 along the direction of the optical axis. In the drawing, AX10 represents the optical axis of the objective lens system and P6 the object plane. The object side and the image side of the objective lens system are coincident with those of the objective lens system of FIG. 4.

The objective lens system as illustrated is composed of, in order from the object side toward the image side, the first lens group G1 composed of a plane-parallel plate L11, a positive meniscus lens L12 with a concave surface opposed to the object side, and a positive meniscus lens L13 with a concave surface opposed to the object side, the second lens group G2 composed of a cemented lens of a negative meniscus lens L21 with a convex surface opposed to the object side and a biconvex lens L22, and a cemented lens of a biconvex lens L23, a biconcave lens L24, and a biconvex lens L25, the third lens group G3 composed of a cemented lens of a biconcave lens L31 and a biconvex lens L32, the fourth lens group G4 composed of a cemented lens of a biconvex lens L41 and a biconcave lens L42, and the moving mechanism as shown in FIG. 17 to FIG. 19, for moving the third lens group G3 along the optical axis AX10.

Next Table 3-2 lists values of specifications in the third embodiment (Embodiment 3-2) of the second lens layout shown in FIG. 23. In Table 3-2, f represents the focal length, N.A. the numerical aperture, B the magnification, and W.D. the working distance.

Further, numerals in the left end column are orders of respective lens surfaces from the object side, r radii of curvatures of the respective lens surfaces, d surface separations of the respective lenses, n and ν refractive indices and Abbe numbers, respectively, for the d-line (λ=587.6 nm).

TABLE 3-2

| f = 1.0 mm, N.A. = 0.75, B = −20.0, W.D. = 0.03 | | | |
|---|---|---|---|
| r | d | ν | n |
| 1 | ∞ | 0.06 | 56.5 | 1.50137 |
| 2 | ∞ | 0.05 | | |
| 3 | −0.585 | 0.84 | 53.1 | 1.71951 |
| 4 | −0.811 | 0.23 | | |
| 5 | −3.584 | 0.51 | 82.6 | 1.49782 |

TABLE 3-2-continued $f = 1.0$ mm, N.A. $= 0.75$, B $= -20.0$, W.D. $= 0.03$

| | r | d | υ | n |
|---|---|---|---|---|
| 6 | −1.303 | 0.03 | | |
| 7 | 96.395 | 0.13 | 56.0 | 1.56883 |
| 8 | 2.766 | 0.53 | 82.6 | 1.49782 |
| 9 | −2.097 | 0.03 | | |
| 10 | 3.236 | 0.43 | 95.6 | 1.43388 |
| 11 | −3.066 | 0.11 | 36.3 | 1.62004 |
| 12 | 1.718 | 1.30 | 95.6 | 1.43388 |
| 13 | −4.139 | (d13 = variable) | | |
| 14 | −5.435 | 0.14 | 53.6 | 1.54739 |
| 15 | 1.678 | 0.48 | 82.6 | 1.49782 |
| 16 | −4.681 | (d16 = variable) | | |
| 17 | 2.304 | 0.44 | 36.3 | 1.62004 |
| 18 | −2.538 | 0.11 | 70.2 | 1.48749 |
| 19 | 1.341 | | | |

(Variable spaces for the respective liquids)

| Type of liquid | Index of refraction, n | d0 | d13 | d16 |
|---|---|---|---|---|
| water | 1.33306 | 0.03 | 0.12 | 0.93 |
| glycerin | 1.47300 | 0.03 | 0.62 | 0.43 |
| oil | 1.51536 | 0.03 | 0.77 | 0.28 |

(Correspondent values to the conditions)

(12) |(N1a · F)/r1| = 0
(13) |(N1a · F)/r2| = 0
(14) |(N1b · F)/r3| = 2.9
(15) d13/F (water) = 0.12
      d13/F (glycerin) = 0.62
      d13/F (oil) = 0.77
(16) |F/f3| = 0.019
(17) (d13 + d16)/F = 1.04
(18) |f12/F + f42/F| = 7.1

FIG. 24A to FIG. 26C are aberration diagrams of Embodiment 3-2. FIGS. 24A–24C are drawings to show aberrations (spherical aberration, astigmatism, and chromatic aberration of magnification) of the objective lens system in the use of water (refractive index n=1.33306). FIGS. 25A–25C are drawings to show aberrations (spherical aberration, astigmatism, and chromatic aberration of magnification) of the objective lens system in the use of glycerin (refractive index n=1.47300). FIGS. 26A–26C are drawings to show aberrations (spherical aberration, astigmatism, and chromatic aberration of magnification) of the objective lens system in the use of oil (refractive index n=1.51536).

In the aberration diagrams, NA represents the numerical aperture, Y the image height, D the d-line ($\lambda$=587.6 nm), G the g-line ($\lambda$=435.8 nm), C the C-line ($\lambda$=656.3 nm), and F the F-line ($\lambda$=486.1 nm).

In the aberration diagrams to show astigmatism, solid lines represent sagittal image surfaces while dashed lines meridional image surfaces. In the diagrams to show chromatic aberration of magnification, the reference is the d-line ($\lambda$=587.6 nm).

As apparent from the aberration diagrams, it is understood that aberrations are well corrected with the liquids having the refractive indices ranging from about 1.6 to about 1.3, such as oil, glycerin, and water.

As described above, the third embodiment can improve the flatness of the image plane in the immersion microscope objective for common use to water immersion and oil immersion without using an embedded lens, can be produced cheaply by the conventional machining techniques, and can expect a considerable cost reduction and stability of quality.

As described, the third embodiment can realize the immersion planapochromat-grade microscope objective having a magnification of about 20×, a numerical aperture (NA) of about 0.75, well corrected for chromatic aberration, having high flatness of the image plane, and maintaining excellent imaging performance.

From the invention thus described, it will be obvious that the invention may be varied in many ways. Such variations are not to be regarded as a departure from the spirit and scope of the invention, and all such modifications as would be obvious to one skilled in the art are intended to be included within the scope of the following claims.

The basic Japanese Applications No.244610/1994, 244611/1994 and 244612/1994 all filed on Sep. 13, 1994 are hereby incorporated by reference.

What is claimed is:

1. An objective lens system comprising, in order from an object side to an image side:

a first lens group having a plane-parallel plate having two surfaces substantially parallel to each other and a cemented lens with a concave surface facing said object side, said first lens group having a negative refractive power;

a second lens group having a positive refractive power; and a third lens group having a positive refractive power; which satisfies the following conditions:

|(N1a·F)/r1|≦0.13

|(N1a·F)/r2|≦0.13

0.16<|r3/N1b·F|<0.2

2<f3/F<3.5 where F is a composite focal length of the overall objective lens system, f3 a focal length of said third lens group, r1 a radius of curvature of the object-side surface of said plane-parallel plate, r2 a radius of curvature of the image-side surface of said plane-parallel plate, r3 a radius of curvature of the object-side concave surface of the cemented lens in said first lens group, N1a a refractive index of said plane-parallel plate, and N1b a refractive index of a most-object-side lens in the cemented lens in said first lens group.

2. An objective lens system according to claim 1, wherein said third lens group comprises a cemented lens having an interface which is convex to the object side, said cemented lens being comprised of a first lens and a second lens in order from the object side.

3. An objective lens system according to claim 2, wherein said cemented lens in said third lens group is of a meniscus shape as a whole.

4. An objective lens system according to claim 2, wherein said cemented lens in said third lens group further comprises a positive lens on a most image side.

5. An objective lens system according to claim 4, wherein said third lens group satisfies the following conditions:

0.01<|(N3b−N3a)·F/r10|

|N3a−N3b|<0.3 where F is the composite focal length of the overall objective lens system, r10 a radius of curvature of the interface in said cemented lens, N3a a refractive index of the first lens in said cemented lens, and N3b a refractive index of the second lens in said cemented lens.

6. An objective lens system according to claim 4, wherein the cemented lens in said third lens group has two interfaces.

7. A microscope comprising:

the objective lens system as set forth in claim 1;

a lens barrel for holding an optical system comprising said objective lens system;

a stage on a main surface of which an observed object can be placed;

a stand for supporting said lens barrel and said stage; and an optical adjusting mechanism for adjusting relative positions of said objective lens system and said stage.

8. An objective lens system according to claim 1, further comprising a moving mechanism for moving said third lens group along the optical axis while supporting said third lens group.

9. An objective lens system according to claim 8, which satisfies the following condition:

$$2 < |(N1b \cdot F)/r3| < 4$$

where r3 is a radius of curvature of the concave surface of the second lens in said first lens group, N1b a refractive index of said second lens, and F a composite focal length of the overall objective lens system.

10. An objective lens system according to claim 8, which satisfies the following condition:

$$0.05 < d13/F < 0.85$$

where F is a composite focal length of the overall objective lens system, and d13 an airspace along the optical axis between said second lens group and said third lens group.

11. An objective lens system according to claim 8, which satisfies following condition:

$$0.01 < |F/f3| < 0.025$$

where F is a composite focal length of the overall objective lens system, and f3 a focal length of said third lens group.

* * * * *